US 11,864,270 B2

(12) United States Patent
Wiemann et al.

(10) Patent No.: US 11,864,270 B2
(45) Date of Patent: Jan. 2, 2024

(54) INCREMENTALLY DISTRIBUTING USER EQUIPMENT CAPABILITY INFORMATION USING A MODEL IDENTIFIER

(71) Applicant: Telefonaktiebolaget LM Ericsson (PUBL), Stockholm (SE)

(72) Inventors: Henning Wiemann, Aachen (DE); Paul Schliwa-Bertling, Ljungsbro (SE); Christofer Lindheimer, Vadstena (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 21 days.

(21) Appl. No.: 17/273,412

(22) PCT Filed: Sep. 27, 2019

(86) PCT No.: PCT/SE2019/050934
§ 371 (c)(1),
(2) Date: Mar. 4, 2021

(87) PCT Pub. No.: WO2020/067987
PCT Pub. Date: Apr. 2, 2020

(65) Prior Publication Data
US 2021/0329444 A1 Oct. 21, 2021

Related U.S. Application Data

(60) Provisional application No. 62/737,745, filed on Sep. 27, 2018.

(51) Int. Cl.
H04W 8/24 (2009.01)
(52) U.S. Cl.
CPC .................... H04W 8/24 (2013.01)
(58) Field of Classification Search
CPC ..... H04W 8/24; H04W 36/0016; H04W 8/22; H04W 36/14; H04W 74/0833;
(Continued)

(56) References Cited

U.S. PATENT DOCUMENTS

2012/0184281 A1    7/2012 Kim et al.
2016/0029275 A1*   1/2016 Guo ................. H04W 36/0016
                                                      455/436
(Continued)

FOREIGN PATENT DOCUMENTS

WO    2019 066190 A1    4/2019

OTHER PUBLICATIONS

3GPP TR 23.743 v0.2.0; Technical Report; 3rd Generation Partnership Project; Technical Specification Group Services and System Aspects; Study on optimisations of UE radio capability signalling (Release 16)—Aug. 2018.
(Continued)

Primary Examiner — Congvan Tran
(74) Attorney, Agent, or Firm — BAKER BOTTS L.L.P.

(57) ABSTRACT

According to some embodiments, a method performed by a network node of incrementally obtaining wireless device capability information comprises: receiving a context setup request for a wireless device from an access and mobility management function (AMF); determining the context setup request does not include device capability information relevant to the network node; transmitting a device capability enquiry to the wireless device; receiving a user UE-ModelId from the wireless device; determining the network node does not have stored device capability information associated with the UE-ModelId; transmitting a device capability enquiry that include a capability filter to the wireless device; receiving a subset of device capabilities identified by the first capability filter from the wireless device; and updating stored device capability information associated with the UE-ModelId with the subset of device capabilities.

20 Claims, 22 Drawing Sheets

1400

| 1412 – receive a device capability enquiry from a network node |

| 1414 – transmit a UE-ModelId to the network node |

| 1416 – determine a subset of device capabilities identified by a capability filter |

| 1418 – transmit the first subset of device capabilities to the network node |

(58) Field of Classification Search
CPC ......... H04W 36/0055; H04W 36/0033; H04W 88/08; H04W 88/02
See application file for complete search history.

(56) References Cited

U.S. PATENT DOCUMENTS

| | | | | |
|---|---|---|---|---|
| 2018/0084539 | A1 | 3/2018 | Kubota et al. | |
| 2018/0227904 | A1* | 8/2018 | Raghunathan | H04W 8/24 |
| 2020/0186312 | A1* | 6/2020 | Mochizuki | H04L 5/0053 |
| 2020/0213836 | A1* | 7/2020 | Kim | H04W 8/24 |
| 2020/0260264 | A1* | 8/2020 | Hapsari | H04W 88/06 |
| 2021/0153191 | A1* | 5/2021 | Takahashi | H04W 72/04 |

OTHER PUBLICATIONS

3GPP TS 23.501 v15.3.0; 3rd Generation Partnership Project; Technical Specification Group Services and System Aspects; System Architecture for the 5G System; Stage 2 (Release 15)—Sep. 2018.
3GPP TS 36.300 v15.2.0; Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)—Jun. 2018.
3GPP TS 36.306 v15.1.0; Technical Specification; 3rd Generation Partnership Project; Technical Specification Group Radio Access Network; Evolved Universal Terrestrial Radio Access (EPUTRA); User Equipment (UE) radio access capabilities (Release 15)—Jul. 2018.
3GPP TS 38.306 v15.2.0; Technical Specification; 3rd Generation Partnership Project; Technical Specification Group Radio Access Network; NR; User Equipment (UE) radio access capabilities (Release 15)—Jun. 2018.
3GPP TS 38.331 v15.2.1; Technical Specification; 3rd Generation Partnership Project; Technical Specification Group Radio Access Network; NR; Radio Resource Control (RRC) protocol specification (Release 15)—Jun. 2018.
3GPP TS 38.413 v15.0.0; Technical Specification; 3rd Generation Partnership Project; Technical Specification Group Radio Access Network; NG-RAN; NG Application Protocol (NGAP) (Release 15)—Jun. 2018.
3GPP TSG-RAN WG2#AH1807, Montreal, Canada; Source: Ericsson; Title: UE Capability "Compression" (Tdoc R2-1809959 (resubmission of R2-1807085)—Jul. 2-6, 2018.
3GPP TSG-RAN WG2 NR ad hoc #1807, Montreal, Canada; Title: Reply LS on optimisation of UE capability signalling; Source: RAN2 (R2-1810966)—Jul. 2-6, 2018.
3GPP TSG-RAN WG2 #103bis, Chengdu, China; Source: Ericsson; Title: On scope of new SI on optimizations of UE radio capability signalling—NR/E-UTRA (FS_RACS_RAN) (Tdoc R2-1814629)—Oct. 8-12, 2018.
3GPP TSG-RAN WG2 #103bis, Chengdu, China; Source: Ericsson; Title: Assumptions and key issues on Study on optimisations on UE radio Capability signalling—NR/E-UTRA Aspects (Tdoc R2-1814630)—Oct. 8-12, 2018.
3GPP TSG-RAN WG3 Meeting #101, Gothenburg, Sweden; Title: Reply LS on maximum size of UE Radio Capabilities and maximum Information Element size on network interfaces (R3-185104)—Aug. 20-24, 2018.
TSG RAN Meeting #RP-80, La Jolla, California, USA; Source: MediaTek Inc., Qualcomm Incorporated, Sprint, Deutsche Telekom, vivo, OPPO, Vodafone, Huawei; Title: New SID: Study on optimisations on UE radio capability signalling—NR/E-UTRA Aspects (RP-181459)—Jun. 13-15, 2018.
PCT International Search Report issued for International application No. PCT/SE2019/050934—dated Jan. 7, 2020.
TSG SA Meeting #SP-80, La Jolla, California, USA; Source: Nokia, Qualcomm; Title: New SID: Study on optimisations on UE radio capability signalling (SP-180599)—Jun. 13-15, 2018.
PCT Written Opinion of the International Searching Authority issued for International application No. PCT/SE2019/050934—dated Jan. 7, 2020.
Examination Report no. 3 issued by the Australian Government/IP Australia for Application No. 2019346309—dated Dec. 9, 2022.
Examination Report No. 4 issued by the Australian Government/IP Australia for Application No. 2019346309—dated Dec. 15, 2022.

* cited by examiner

INCREMENTALLY DISTRIBUTING USER EQUIPMENT CAPABILITY INFORMATION USING A MODEL IDENTIFIER

PRIORITY

This nonprovisional application is a U.S. National Stage Filing under 35 U.S.C. § 371 of International Patent Application Serial No. PCT/SE2019/050934 filed Sep. 27, 2019 and entitled "Incrementally Distributing User Equipment Capability Information Using a Model Identifier" which claims priority to U.S. Provisional Patent Application No. 62/737,745 filed Sep. 27, 2018 both of which are hereby incorporated by reference in their entirety.

TECHNICAL FIELD

Particular embodiments relate to wireless communication, and more specifically to an incremental user equipment (UE) capability identifier (ID).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Third Generation Partnership Project (3GPP) commonly refers to the different support levels of a user equipment (UE) as UE capabilities. Standards documents list all possible UE capabilities (i.e., information that the UE can provide to the network about its level of support for various features).

For long term evolution (LTE)/evolved universal terrestrial access network (E-UTRAN), the UE capabilities are specified in 3GPP TS 36.306. For fifth generation (5G) new radio (NR), the UE capabilities are specified in 3GPP TS 38.306.

The 3GPP Architecture Specification (TS 23.501 v 15.3.0) describes the UE radio capability handling. The UE radio capability information (also referred to as device capability information) contains information, for example, on radio access technologies (RATs) that the UE supports (e.g., power class, frequency bands, etc.). Consequently, the information can be sufficiently large that it is undesirable to send it across the radio interface at every transition of UE connection management (CM) state in the access and mobility management function from CM-IDLE to CM-CONNECTED. To avoid the radio overhead, the AMF stores the UE radio capability information during CM-IDLE state for the UE and RM-REGISTERED state for the UE and the AMF, if it is available, sends its most up to date UE radio capability information to the radio access network (RAN) in the N2 REQUEST message.

The AMF deletes the UE radio capability when the UE RM state in the AMF transitions to RM-DEREGISTERED. The UE radio capability is maintained in the core network, even during AMF reselection.

If the UE's next generation radio access network (NG-RAN) UE radio capability information changes while in CM-IDLE state, the UE performs the Registration procedure with the Registration type set to Mobility Registration Update indicating "UE Radio Capability Update". When the AMF receives the Registration Update Request with "UE Radio Capability Update," it deletes any UE radio capability information that it has stored for the UE. If the trigger to change the UE's NG-RAN UE radio capability information happens when the UE is in CM-CONNECTED state, the UE first enters CM-IDLE state and then performs the Registration procedure with the Registration type set to Mobility Registration Update indicating "UE Radio Capability Update".

The RAN stores the UE radio capability information, received in the N2 message or obtained from the UE, for the duration that the UE is in RRC connected or RRC Inactive state.

3GPP TS 38.413 includes further description of how UE radio capabilities are managed and how capability information is distributed. For example, TS 38.413 describes procedures between the gNB and the AMF referred to as UE radio capability management procedures. The purpose of the procedures is to allow NG-RAN to provide to the AMF UE radio capability-related information. The procedure uses UE associated signaling. An example is illustrated in FIG. 1.

FIG. 1 is a sequence diagram illustrating an example UE radio capability management procedure. In the illustrated example, an NG-RAN node controlling a UE-associated logical NG-C connection initiates the procedure by sending a UE RADIO CAPABILITY INFO INDICATION message to the AMF including the UE radio capability information. The UE RADIO CAPABILITY INFO INDICATION message may also include paging specific UE radio capability information within the UE Radio Capability for Paging information element (IE). The UE radio capability information received by the AMF replaces previously stored corresponding UE radio capability information in the AMF for the UE.

Typically, as described above, the initial signaling of capabilities from the AMF to RAN is included in the Initial Context Setup Request Message, sent by the AMF to setup a UE context. This message optionally includes UE radio capabilities if such are present in the AMF. If not, the gNB needs to request information from the UE as further described below. If the UE de-registers, the AMF does not save capabilities any longer.

3GPP TS 38.331 describes the signaling over the air for NR (RRC signaling), including the UE capability transfer in RRC CONNECTED mode. An example is illustrated in FIG. 2.

FIG. 2 is a sequence diagram illustrating an example UE capability transfer procedure. As illustrated, the network initiates the procedure to a UE in RRC CONNECTED when it needs (additional) UE radio access capability information. The UE sets the contents of UECapabilityInformation message as follows:
1> if the ue-CapabilityRequest includes nr:
    2> include the UE-NR-Capability within a ue-CapabilityRAT-Container and with the rat-Type set to nr;

2> include band combinations supported by the UE into supportedBandCombination as specified in 38.331 Section 5.6.1.4;
1> if the ue-CapabilityRequest includes eutra and if the UE supports EUTRA:
2> include the UE-EUTRA-Capability within a ue-CapabilityRAT-Container and with the rat-Type set to eutra;
1> submit the UECapabilityInformation message to lower layers for transmission, upon which the procedure ends.
For compilation of band combinations supported by the UE, the UE performs the following:
1> if FreqBandList is received:
2> if the received FreqBandList contains at least one of maxBandwidthRequestedDL, maxBandwidthRequestedUL, maxCarriersRequestedDL or maxCarriersRequestedUL for at least one of the bands:
3> compile a list of band combinations, candidate for inclusion in the UECapabilityInformation message, only consisting of bands included in FreqBandList, where for each band in the band combination, the parameters of the band do not exceed the corresponding parameters provided by the IEs maxBandwidthRequestedDL, maxBandwidthRequestedUL, maxCarriersRequestedDL, maxCarriersRequested, ca-BandwidthClassDL-EUTRA or ca-BandwidthClassUL-EUTRA, whichever are received.
2> else:
3> compile a list of band combinations, candidate for inclusion in the UECapabilityInformation message, only consisting of bands included in FreqBandList, and prioritized in the order of FreqBandList, (i.e., first include remaining band combinations containing the first-listed band, then include remaining band combinations containing the second-listed band, and so on);
2> for each band combination included in the candidate list:
3> if it is regarded as a fallback band combination with the same capabilities of another band combination included in the list of candidates as specified in TS 38.306:
4> remove the band combination from the list of candidates;
2> include all band combinations in the candidate list into supportedBandCombination;
2> include the received FreqBandList in the field appliedFreqBandListFilter of the requested UE capability;
1> else:
2> include all band combinations supported by the UE into supportedBandCombination, excluding fallback band combinations with the same capabilities of another band combination included in the list of band combinations supported by the UE;
1> if the requested rat-Type is nr:
2> include the featureSets for the supportedBandCombination included above;
2> include the featureSetCombinations corresponding to the supportedBandCombinations and for the featureSets included above;
1> if the requested rat-Type is eutra-nr:
2> include the featureSetCombinations corresponding to the supportedBandCombinations included above and to the featureSets included in a corresponding capability request for rat-Type set to nr.

For E-UTRAN NR dual connectivity (EN-DC), the network needs the capabilities for RAT types nr and eutra-nr and it uses the featureSets in the UE-NR-Capabilities together with the featureSetCombinations in the UE-MRDC-Capabilities to determine the UE capabilities for the supported multiple RAT dual connectivity (MRDC) band combinations. Thus, the IDs used in the featureSets must match to the IDs referred to in featureSetCombinations.

There currently exist certain challenges. For example, with the increase in different band combinations and support for different frequencies, the amount of UE radio capability information is increasing. The amount of information may exceed the capability to send and process the information.

Some requirements for new solutions are found in 3GPP TR 23.743, v0.2.0. A solution for the UE radio capability signaling optimizations should take the following requirements into account: (a) solutions should support UE Radio Access Capabilities greater than 65,536 bytes; (b) solutions should provide fast, reliable, low processing complexity mechanisms for frequently used procedures (at least Service Request, RRC Connection Resume, X2&Xn handover, secondary gNB addition); (c) the "UE Capability ID" should reflect the actual UE capabilities and not rely on parameters that may be faked, modified, or do not reflect the actual capabilities (e.g., International Mobile Equipment Identity (IMEI) and IMEI software version number (IMEI-SV) might not fulfil this requirement because even the same UE model with identical software versions may have different UE capabilities e.g., because of customization based on vendor-operator agreements (sometimes the UE capabilities also differ depending on the public land mobile network (PLMN) the device roams on) and would therefore present different "UE Capability IDs" depending e.g. on the PLMN that the UE roams.); (d) solutions should ensure that malicious implementations (outside of the operator's network) do not update the network with incorrect UE radio capabilities that corresponds to UE capability ID that are used by other UE's; and (e) solutions should be flexible enough to cope with additional UE capabilities that might be added by 3GPP in future releases.

Optimizations may include procedures pertaining to the transfer of UE radio capabilities related information to the RAN and to the core network. An efficient representation of the UE radio capabilities may be defined as, for example, a UE capability identity that represents the actual UE radio capabilities (e.g., existing parameter such as IMEI-SV, an abstracted representation of the UE capabilities, new parameters, or a combination of them), scope (e.g., globally unique, unique per-PLMN, etc.) and the entity (e.g., operator, device manufacturer, standards body including 3GPP, industry fora like the Global System for Mobile Communications Association (GSMA)) that performs the mapping from a particular identity to a set of UE radio capabilities. Some proposals are found in 3GPP contribution R2-1809959, which is available at www.3gpp.org.

Particular embodiments described herein associate a UE capability information structure with a "UE capability ID" or "model identifier." Depending on the chosen solution, such an ID reduces the signaling between a UE and gNB as well as between gNB and AMF. It may also reduce the memory consumption for storing UE capabilities in AMF and gNB. In the gNB, it significantly reduces the amount of processing time spent on parsing and analyzing the UE capability octet strings upon UE connection establishment.

In E-UTRA, an eNB obtains the UE capabilities for a connecting UE from the MME. If the MME has not stored the capabilities for the UE (e.g., upon ATTACH), the eNB fetches them from the UE. While this reduces the signaling over the radio interface during (most/many) connection establishments, it requires a significant amount of storage, transmission and processing in the RAN and the core network.

Even though all UEs of the same model and with the same software version support the same set of capabilities, E-UTRAN and evolved packet core (EPC) handle the UE capabilities as if they were UE specific. Because the RAN is not required/supposed to maintain any information about individual IDLE UEs, it must re-acquire and process the UE capabilities every time a UE connects.

In typical LTE networks, only about 15 to 20 different UE models (same IMEI-SV) account for 50% of the UE population.

Earlier proposals suggest that the RAN (and possibly the CN) can identify UEs that support the same set of UE capabilities. This enables the RAN (and possibly the CN) to store just one set of capabilities for each "UE model" rather than one per individual device. The "UE model" (hardware and software version) may be indicated as an ID such as (or similar to) what is included in IMEI-SV.

The following describes particular scenarios that may occur, the signaling that occurs in each scenario, and the situations in which a UE capability ID provides benefits.

A first scenario is when UE capabilities are not known to the AMF. Upon initial attach, for example, the AMF does not yet know the UE capabilities and may thus not provide them in the "Initial Context Setup" (see FIG. 6, for example). If NR follows the LTE baseline, the gNB has to acquire the required UE capabilities from the UE (see FIG. 7, for example).

In addition to the requested UE capabilities, the UE should provide the UE-ModelId to the gNB. If the gNB knows the UE radio capability information associated with the UE-ModelId (from the same UE or from another UE with the same ID) it may use those and ignore the UE radio capability information (UE-NR-Capability) received from the UE. To separate the UE-ModelId from the actual UE capability container, each may be stored in separate containers.

If the gNB does not have a stored version of the UE radio capability information associated with the UE-ModelId, it processes the UE capabilities and uses them to reconfigure the UE as currently done in LTE. Furthermore, the gNB may store the processed UE capabilities together with the UE-ModelId for later use with the same or a different UE.

Also like in LTE, the gNB may forward the received UE capabilities to the AMF. In addition to the actual UE radio capability information, the gNB also forwards the UE-ModelId, which may, as mentioned above, be carried in a separate container. The AMF may store the UE-ModelId in association with the UE so that it can provide the UE capabilities to the gNB upon a subsequent connection establishment of the same UE. If the AMF has not stored the UE radio capability information for the UE-ModelId, it should also store those. An example is illustrated in FIG. 3.

FIG. 3 is a sequence diagram illustrating an example connection procedure when the AMF does not provide UE capabilities to the gNB. In the illustrated example, the AMF does not provide UE capabilities to the gNB upon initial ATTACH or other NAS message and the gNB requests UE capabilities and UE-ModelId at one time.

Upon receiving the UE-ModelId and UE capabilities, the gNB determines whether it already has UE capability information for the UE-ModelId. If so, the UE does not have to process the received UE capabilities, and instead uses the preprocessed version already stored with the known UE-ModelId. If the gNB does not already have the UE capability information, then the gNB processes and stores the received UE capabilities and associated UE-ModelId.

To reduce the UE capability signaling over the Uu interface, the gNB may alternatively request only the UE-ModelId from the UE when the AMF does not provide the UE's capabilities in the initial context setup request. An example is illustrated in FIGS. 4A and 4B.

FIGS. 4A and 4B are a sequence diagram illustrating another example connection procedure when the AMF does not provide UE capabilities to the gNB. In the illustrated example, the AMF does not provide UE capabilities to gNB on initial ATTACH, and the gNB requests UE-ModelId initially and (complete) UE capabilities only if neither gNB nor AMF have the UE capabilities.

If the gNB has already stored the UE capabilities associated with the requested UE-ModelId, the gNB may provide the combination of the two to the AMF as in FIG. 3. If the gNB does not know the corresponding UE capabilities, it has two options.

One option is that the gNB requests the missing UE capabilities from the UE using the traditional capability enquiry mechanism. The gNB then processes the received capabilities and provides both the capabilities and the UE-ModelId to the AMF.

Alternatively, the gNB may request the UE capabilities corresponding to the UE-ModelId from the AMF. If the AMF has a stored version of the capabilities (from the same UE or another UE of the same model), the AMF will return those to the gNB. If not, the gNB may request the full capabilities from the UE. The sub-option may require a new procedure towards the CN. Furthermore, these options bears a risk that a rogue UE could provide its capabilities with a fake UE-ModelId that actually belongs to some other UE model. If the gNB requests the UE capabilities from the AMF using the UE-ModelId obtained from the UE, the subsequent reconfiguration is likely to fail. However, the network will notice this, and can fetch the full capabilities from the UE.

Another scenario includes connection establishment where UE capabilities are known to the AMF. An example is illustrated in FIG. 5.

FIG. 5 is a sequence diagram illustrating an example connection procedure where the AMF provides UE capabilities to the gNB. If the UE was already attached, it provides its UE-ModelId to the CN in the initial NAS Service Request. Based on this information, the AMF looks up the UE radio capability information and provides it to the gNB. In addition to the full UE radio capability information, the AMF may also provide the UE-ModelId.

If the gNB already has a pre-processed version of the UE radio capability information for the received UE-ModelId, it may use that stored version and ignore the actually received UE radio capability information. If the gNB does not have a pre-processed version of the UE capabilities, the gNB processes the received octet string as currently done in LTE. The gNB may store the processed UE capabilities for later use with the same or with a different UE of the same model.

Processing the continuously increasing UE capability octet strings is a significant effort in the RAN. Therefore, it is a benefit if the gNB can store and use the readily processed UE capabilities. Based on the sequence diagrams in FIGS. 1-5, and considering that initial attach occurs hundreds or thousands of times more frequently than regular connection establishment, particular embodiments described herein may focus on solutions for the latter.

FIG. 6 is a sequence diagram illustrating an example E-UTRA Initial Context Setup procedure in an Idle-to-Active procedure. FIG. 7 is a sequence diagram illustrating an example initial UE capability handling procedure. FIGS. 6 and 7 are reproduced from 3GPP TS 36.300 and are described in more detail in the technical specification.

Other potential solutions are described in 3GPP TR 23.743 v0.2.0. One problem that previous solutions have failed to address, however, is that even though it is possible to use the UE Capability ID, an efficient method for how the network learns what the Capability ID means is lacking.

Another challenge with using the above-described solution and UE Model-ID, UE-ModelId, or UE Capability ID (used interchangeably herein) is that in situations when there is no information about the meaning of a UE Model-ID/UE-ModelId/UE Capability ID, then there is a need for a UE to provide a significant amount of information to populate the interpretation of the UE Model-ID/UE-ModelId/UE Capability ID.

SUMMARY

As described above, certain challenges currently exist with distributing user equipment (UE) capability information. Certain aspects of the present disclosure and their embodiments may provide solutions to these or other challenges.

For example, particular embodiments include a UE-ModelId that unambiguously identifies a set of UE capabilities supported by a "UE model" and convey the UE-ModelId separately from, but together with, the actual UE capabilities from an access and mobility management function (AMF) to a gNB. Storing and/or transporting the UE-ModelId in a separate capability container (like for capabilities of different radio access technologies (RATs)) is a minor change and facilitates the gNB to fetch only the UE-ModelId from the UE if desired.

In some embodiments, population of UE radio capability information (device capability information) for a UE Capability ID (UE-ModelId) is performed incrementally.

According to some embodiments, a method performed by a wireless device of incrementally distributing wireless device capability information comprises: receiving a first device capability enquiry from a first network node; and transmitting a user equipment (UE) model identifier (UE-ModelId) to the first network node. The UE-ModelId identifies a set of device capabilities for all wireless devices that share the same UE-ModelId. In some embodiments, the wireless device may transmit the UE-ModelId and a subset of device capability information associated with the UE-ModelId.

In particular embodiments, the first device capability enquiry includes a first capability filter and the method further comprises: determining a first subset of device capabilities identified by the first capability filter; and transmitting the first subset of device capabilities to the first network node.

In particular embodiments, the method further comprises: receiving a second device capability enquiry from a second network node, the second device capability enquiry including a second capability filter; determining a second subset of device capabilities identified by the second capability filter; and transmitting the second subset of device capabilities to the second network node.

In particular embodiments, the capability filter comprises a bandwidth combination and/or a radio access technology (RAT) type.

According to some embodiments, a wireless device is capable of incrementally distributing wireless device capability information. The wireless device comprises processing circuitry operable to perform any of the wireless device methods described above.

According to some embodiments, a method performed by a network node of incrementally obtaining wireless device capability information comprises: receiving a context setup request for a first wireless device from an AMF; determining the context setup request does not include device capability information relevant to the network node; transmitting a first device capability enquiry to the first wireless device; receiving a UE-ModelId from the first wireless device, wherein the UE-ModelId identifies a set of device capabilities for all wireless devices that share the same UE-ModelId; determining the network node does not have stored device capability information associated with the UE-ModelId relevant to the network node; transmitting a second device capability enquiry to the first wireless device, the second device capability enquiry including a capability filter that identifies capability information relevant to the network node; receiving a first subset of device capabilities identified by the first capability filter from the first wireless device; and updating stored device capability information associated with the UE-ModelId with the first subset of device capabilities.

In particular embodiments, the method further comprises transmitting the UE-ModelId and the first subset of device capabilities to the AMF.

In particular embodiments, the method further comprises: transmitting a third device capability enquiry to a second wireless device, the third device capability enquiry including a capability filter that identifies capability information relevant to the base station; receiving a second subset of device capabilities identified by the first capability filter from the second wireless device; and updating stored device capability information associated with the UE-ModelId with the second subset of device capabilities.

In particular embodiments, the method further comprises transmitting the UE-ModelId and the second subset of device capabilities to the AMF.

In particular embodiments, the capability filter comprises a bandwidth combination and/or a radio access technology (RAT) type.

According to some embodiments, a network node is capable of incrementally obtaining wireless device capability information. The network node comprises processing circuitry operable to perform any of the network node methods described above.

Also disclosed is a computer program product comprising a non-transitory computer readable medium storing computer readable program code, the computer readable program code operable, when executed by processing circuitry to perform any of the methods performed by the wireless device described above.

Another computer program product comprises a non-transitory computer readable medium storing computer readable program code, the computer readable program code operable, when executed by processing circuitry to perform any of the methods performed by the network node described above.

Certain embodiments may provide one or more of the following technical advantages. For example, particular embodiments facilitate efficient exchange of UE capability information, which reduces processing at the network node and reduces traffic over the radio access network.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, certain challenges currently exist with distributing user equipment (UE) capability information. Certain aspects of the present disclosure and their embodiments may provide solutions to these or other challenges. Particular embodiments include a UE-ModelId that unambiguously identifies a set of UE radio capabilities (device capabilities) supported by a "UE model" and convey the UE-ModelId separately from, but together with, the actual UE capabilities from an access and mobility management function (AMF) to a gNB. Storing and/or transporting the UE-ModelId in a separate capability container facilitates the gNB to fetch only the UE-ModelId from the UE if desired. In some embodiments, population of UE radio capability information for a UE Capability ID (UE-ModelId) is performed incrementally.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In particular embodiments, if the AMF has not provided the UE radio capability information as part of establishment of UE context in the radio access network (RAN), the RAN retrieves the UE radio capability information over the radio interface and notifies the AMF using the N2 UE Capability Info Indication message. An example is illustrated in FIG. 8.

Figure 8:
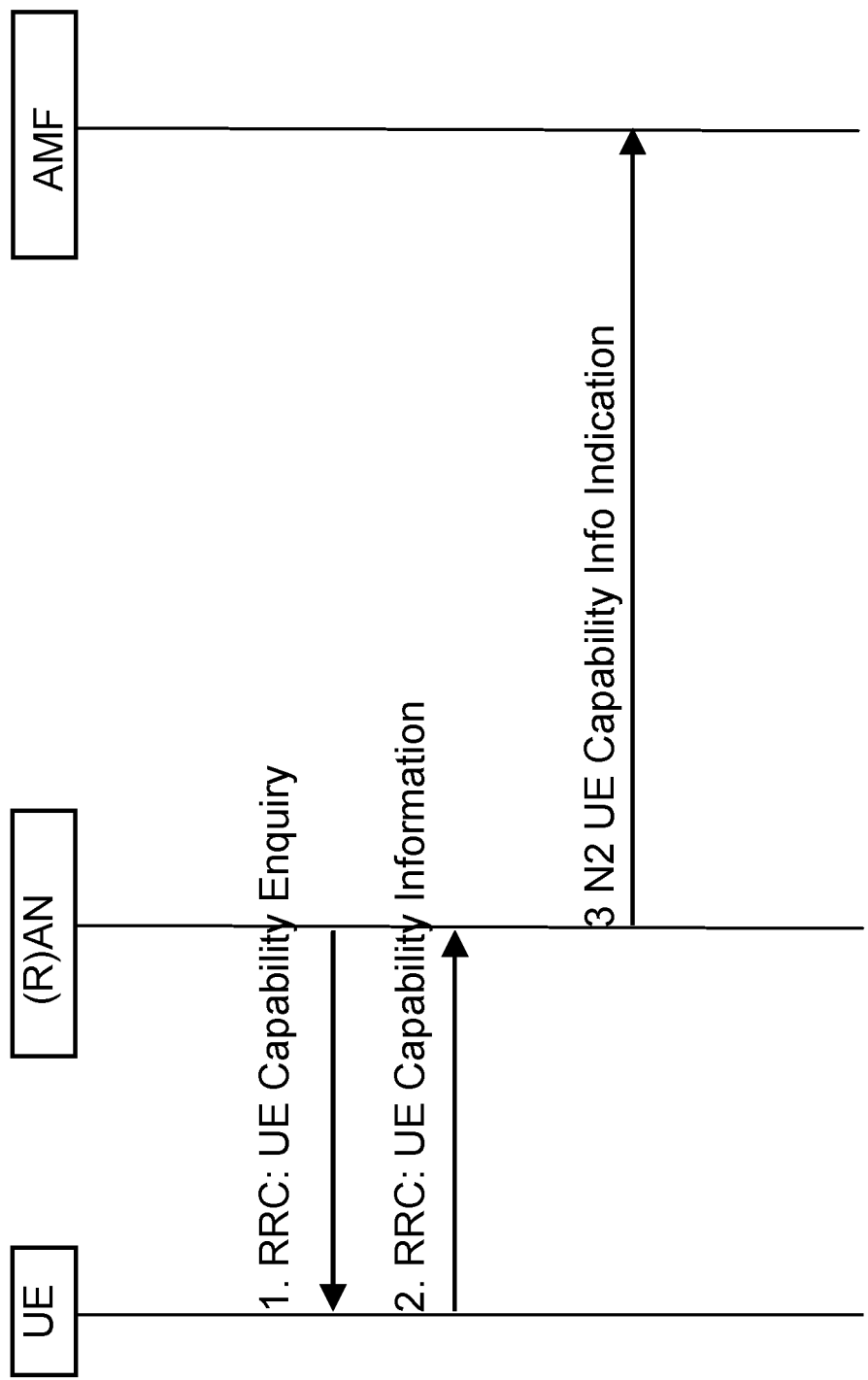
FIG. 8 is a sequence diagram illustrating an example of retrieving device capability information.

FIG. 8 is a sequence diagram illustrating an example of retrieving device capability information. At step 1, if the (R)AN has not already received the UE radio capabilities from the AMF, the (R)AN requests the UE to upload the UE radio capability information. At step 2, the UE provides the (R)AN with its UE radio capabilities by transmitting the RRC UE Capability Information. At step 3, the (R)AN sends the UE radio capability information to the AMF. The AMF stores the UE radio capability information without interpreting it for further provision to the (R)AN as per TS 23.501 clause 5.4.4.1.

In connection with signaling the UE radio capability information from the UE to the gNB and of UE radio capability information indications from RAN to AMF, an associated UE Capability ID (UE-ModelId) is also signaled. The Capability ID may in one example be a code with a vendor-specific portion and a model or software specific portion. Other types of UE Capability ID's are also possible.

In particular embodiments, the N2 UE Capability Information Indication may contain an addition to previous sets of capability information applicable for a certain UE Capability ID. The same UE Capability ID may thus be defined by different sets of UE Capability info indications, including different capability containers for different RAT-Types and band combinations, as described below.

In particular embodiments, the AMF and the gNB or at least one of the AMF and the gNB, or optionally just the AMF may store, for each signaled UE Capability ID, capability containers that are received from different UEs or from the same UE but in different transmissions. In this way, the definition or meaning of a UE Capability ID (UE-ModelId) and its corresponding UE radio capability information (device capability information) is gradually built-up, adding more band combinations as more are signaled from UEs.

In some embodiments, UE radio capability information transmitted from the UE to the network (gNB) does not need to be exhaustive (include all UE capabilities). The UE may receive a capabilityEnquiry only for information relevant to a certain gNB and return only that capability information to the gNB. This, in combination with the UE Capability ID provides to the network a UE Capability ID to radio capability information "fragment." As more UEs in other gNBs receive different enquiries, a full definition of UE Capability ID-to-UE radio capability information mapping may ultimately be reached. This may be referred to as an "incremental definition" of the meaning of a Capability ID.

For example, UE 1 transmits UE Capability ID 1 and UE capability information set A (e.g., applicable for certain band combinations). UE 2 transmits UE Capability ID 1 and UE capability information set B (e.g., applicable for other band combinations). Then, the meaning of UE Capability ID 1=A+B. This means that both UE 1 and UE 2 will support A+B (as this is the meaning of their UE Capability ID) but this also facilitates filtering UE capability requests and reduces the amount of information that needs to be transmitted to what is relevant for a particular gNB at a particular time. This thus facilitates incremental definitions of UE Capability ID-to-UE radio capability information mapping.

According to some embodiments, a UE is at any given time only associated with one UE Capability ID. The UE capability ID may be globally unique such that it is valid in all networks. One solution for how the ID's are constructed is such that a UE vendor gets a vendor-unique code and to this, appends a model or software-unique portion, such that the vendor portion plus the model/sw-portion together constitute the UE Capability ID (UE-ModelId).

At least two different cases may be considered on how the capabilities are retrieved by the RAN node. Either the capabilities of a certain UE are stored in the AMF, or they are not. Both cases are addressed below.

At initial attach, there is no UE capability information in the AMF because there is no context. Using the UE capability ID though, the AMF may store, or have access to, a UE capability ID to UE Capability information mapping that is specific to UE models rather than specific UE contexts.

Thus, even if the AMF does not have a UE context including a specific UE capability for a specific UE, the AMF may have access to a generic mapping of UE Capability ID-to-UE radio capability information. The generic mapping can be used by any UE/Request when adding information to a UE context or providing information to a gNB.

In some embodiments, at initial attach, the gNB may acquire the required UE capabilities. If nothing is stored in the AMF, the gNB retrieves the UE radio capability information from the UE. The UE capability retrieval may also be performed by the gNB when no UE capability information is provided by the AMF at the UE Context Setup procedure.

As one option, the UE initially sends only a UE Capability ID, irrespective of how the enquiry looks. As another option, the UE sends initially a response including UE capability information corresponding to the enquiry.

In the first option, the gNB can request information from the AMF based on the UE Capability ID provided by the UE, which means that there is a minimal amount of information sent from the UE initially. If the AMF does not have relevant information about a certain Capability ID, then, the gNB need to again require the information from the UE. This can be triggered by a lack of UE capability information in the initial UE Setup Request message from the AMF. The sequence becomes:
 1. gNB→UE—Send capabilityEnquiry
 2. UE→gNB—Respond with UE Capability ID
 3. gNB→AMF—Ask for UE Capability ID interpretation
 4. AMF→gNB
  a. AMF→gNB—Interpretation successful, AMF had UE Capability ID
   i. Include UE capability information in UE context setup procedure
  b. AMF→gNB—Interpretation unsuccessful, AMF lack relevant information of UE Capability ID
   i. gNB→UE—Send CapabilityEnquiry (Filtered)
   ii. UE→gNB—Send UE Capability information (Filtered)+UE Capability ID
   iii. gNB→AMF—Update UE context with UE Capability information
   iv. AMF→AMF—Update UE Capability ID to Capability information database In step 4-b-ii above, the UE may provide not only the capabilities that correspond to the enquiry, but also the UE capability ID. In the steps above, it is not mentioned that the gNB stores any capabilities, but for the UE context, the gNB may store all retrieved capabilities, whether they come from the AMF or from the UE directly. To separate the UE Capability ID from the actual UE capability container, they may be stored in two separate containers.

In step 4-a-i above, in connection to the UE context that is updated with UE capability information from the AMF, it may be that the gNB determines that the provided capability information is insufficient. The gNB may then also request other filtered information from the UE and append the result to the capability container and return it to the AMF so that the next gNB does not need to do the same request again.

It is also possible that the gNB stores the mapping of the UE Capability ID to the actual UE capabilities from an earlier visit of the same UE or from a UE with the same UE capability ID. In this case, the gNB does not have to wait for the AMF to provide the actual UE capabilities. The gNB may perform the RRCReconfiguration based on its locally stored version of the UE capabilities. An example sequence is as follows:
 1. gNB→UE—Send capabilityEnquiry
 2. UE→gNB—Respond with UE Capability ID
 3. gNB→gNB—Retrieve Capability information from Capability ID
 4. gNB→AMF—Store the received UE Capability ID with the UE context (and possibly update the generic mapping)

As indicated in step 4 above, the AMF may at least store the UE Capability ID in association with this UE so that it can provide the UE capabilities to the gNB upon a subsequent connection establishment of the same UE.

In particular embodiments, UE capability information retrieval starts with UE Capability ID and network-to-network inquires. Only if this is unsuccessful is there a request to the UE.

Another example includes connection establishment where UE capabilities are stored in the AMF. This is a simpler case for the gNB to manage. If the UE was already attached/had user plane setup, the UE provides its ID to the CN in the NAS Service Request. Based on this information, the AMF looks up the UE radio capability information and provides it to the gNB. This signaling may use the UE Capability ID format. If the gNB does not have a stored translation from UE Capability ID to UE Capability information, it can re-request the AMF to send explicit UE radio capability information and a UE Capability ID. Then the gNB can store if for later use.

Particular embodiments assume that knowledge of UE Capability ID-to-UE radio capability information is stored in both the AMF and the gNB. If UE radio capability information is requested, it should be accompanied with a UE Capability ID.

If the UE Capability information received from the AMF to gNB does not match (e.g., the band combinations supported by the gNB), the gNB retrieves the UE radio capability information using a UE Capability Inquiry procedure. The retrieved UE radio capability information is added to the UE radio capability information in an incremental manner and stored in the AMF.

In general, the AMF does not need to process or interpret the UE capabilities or the associated UE Capability ID, it connects them and acts as a database for already retrieved UE capability ID and corresponding capability information. Only if the gNB does not have pre-processed information about capabilities corresponding to a UE Capability ID, the gNB processes a received octet string with UE radio capability information. Thus, if it stores processed UE capabilities (and ID's) it can later use both for the same UE's or different UE's of the same model.

Signaling of UE capabilities over the air uses the UE Capability ID. However, in situations when there is no UE Capability ID-to-UE capability information mapping, there is a need to send UE radio capability information over the air. From this perspective, the UE Capability ID does not solve the problem that there are huge amounts of capability information to transmit. At least initially, when the network is unaware of the interpretation of a Capability ID, it needs to be sent from the UE.

Particular embodiments assume that there is no initial definition of UE Capability ID-to-UE radio capability information mapping. To build up the information in the network for all possible UE models will take time, but for the most popular UE models, which correspond to UE Capability IDs, for these IDs, information may be built-up relatively quickly. Thus, particular embodiments are optimized for a situation when it is assumed that the network has all information about the UE Capability ID to UE capability information mapping, instead of assuming that it needs to be complemented. Thus, particular embodiments for how to signal UE capabilities assume that there is network knowledge of UE Capability ID-to-UE radio capability information mapping.

According to some embodiments, UE radio capability information transmitted from the UE to the network (gNB) does not need to be exhaustive (include all UE capabilities). The UE may receive a capabilityEnquiry only for information relevant to a certain gNB. This, in combination with the UE Capability ID would provide to the network a UE Capability ID to radio capability information "fragment." As more UEs in other gNBs receive different enquiries, a full definition of UE Capability ID-to-UE radio capability information mapping is ultimately reached. This can be referred to as an "incremental definition" of the meaning of a Capability ID.

For example, UE 1 transmits UE Capability ID 1 and UE Capability information set A (e.g., applicable for certain band combinations). UE 2 transmits UE Capability ID 1 and UE Capability information set B (applicable for other band combinations). Then, the meaning of UE Capability ID 1=A+B. This means that both UE 1 and UE 2 support A+B (as this is the meaning of their UE Capability ID) but this facilitates filtering UE capability requests and reduces the amount of information that needs to be transmitted to what is relevant for a particular gNB at a particular time. Particular embodiments include incremental definitions of UE Capability ID-to-UE radio capability information mapping.

According to some embodiments, the UE Capability ID and its definition, through increments that are signaled from various UEs, are stored not only in connection to the context of specific UE's, but the AMF may also serve as a database for capability ID-to-Capability Information mapping, such that Capabilities are stored generally. This information can then be retrieved by using the UE Capability ID and all information thereto associated may also be retrieved.

As described above, the UE Capability ID and its corresponding capability information can actually correspond to multiple filtered UE Capability containers that are associated to the UE Capability ID. The details of information from UE capability signaling can be signaled in different UE capability containers as described further in 38.331. Containers that associate a certain UE Capability ID may be stored together with the UE capability ID, and gNBs are able to retrieve the complete set of all information in all associated capability containers.

This means that when a UE is involved in a capability transfer as described below, it may, according to some embodiments, also include a UE capability ID for which the band combinations and feature set combinations below are valid. The UE radio capability information may not be the complete information. In fact, in particular embodiments, the network nodes, both gNB and AMF, when receiving UE radio capability information from the UE, will assume that it is not the complete information for the UE Capability ID, but simply add to previously received information about what corresponds to a certain UE Capability ID.

In particular embodiments, the network builds up the interpretation and meaning of a UE Capability ID through signaling from several different UEs.

Figure 9:
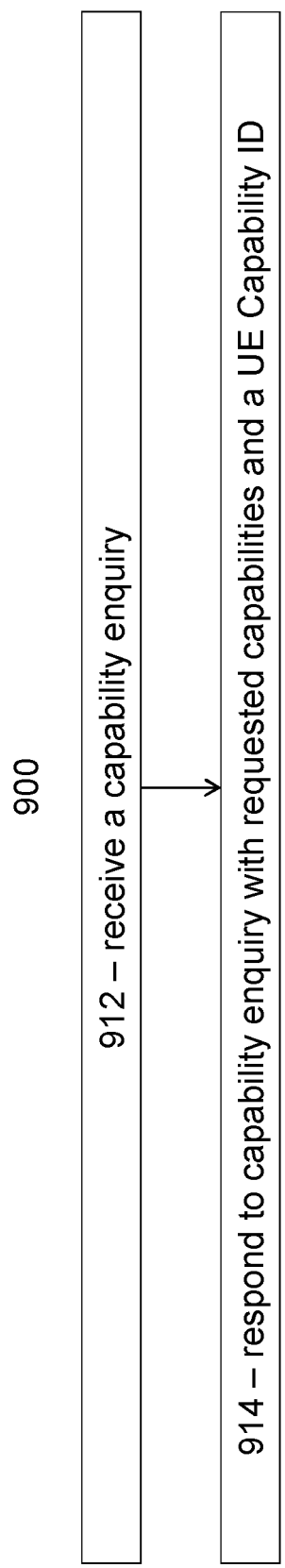
FIG. 9 is a flow diagram illustrating an example embodiment in a UE, according to some embodiments.

FIG. 9 is a flow diagram illustrating an example embodiment in a UE, according to some embodiments. The UE includes knowledge of, at least for the situation, a relevant UE Capability ID. The UE responds to a request for capability information from the gNB. For example, in step 912 the UE receives capability information request (capability enquiry) from the gNB. The request may be a request for information on UE capabilities, for example, for particular frequencies. In other words, the capability information request may request a subset (filtered request) of the UE's complete UE radio capability information. The request in step 912, from the gNB, may or may not include a UE Capability ID.

At step 914, the UE responds with capability information as requested and it may or may not associate the information with a UE capability ID that is relevant for the request or at least for the current situation.

Figure 10:
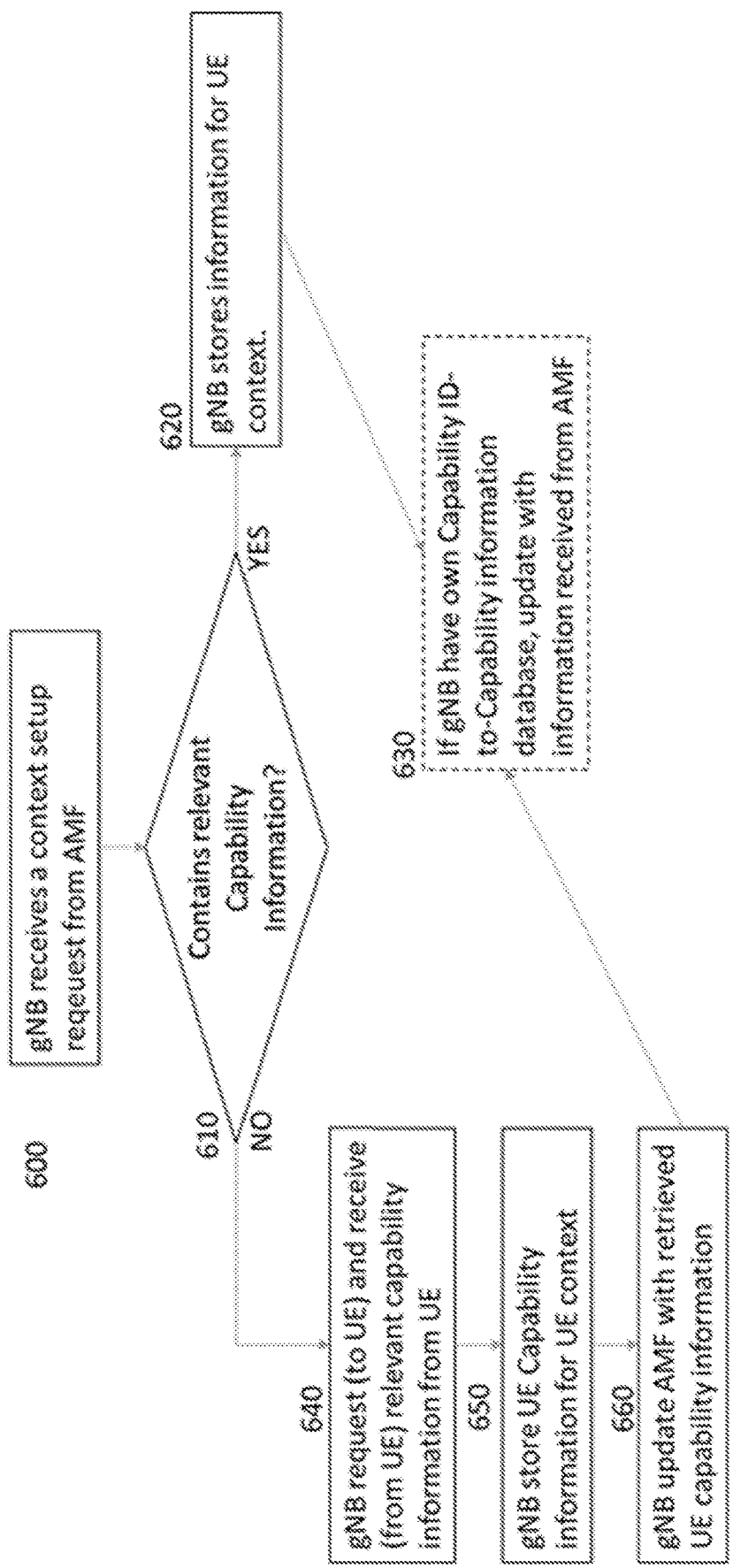
FIG. 10 is a flow diagram illustrating an example embodiment in a gNB, according to some embodiments.
Figure 11:
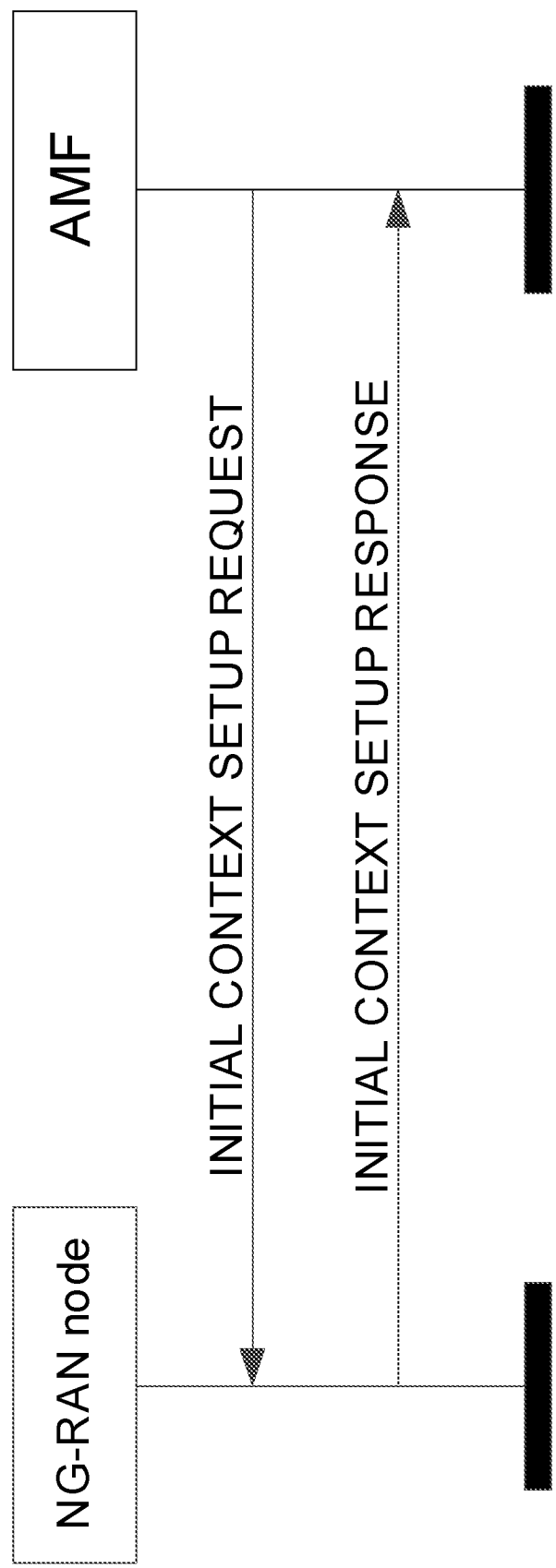
FIG. 11 is a sequence diagram illustrating an initial context setup request procedure as described in 3GPP 38.413.

FIG. 10 is a flow diagram illustrating an example embodiment in a gNB, according to some embodiments. At step 600, the gNB receives a request for a context setup from the AMF. This procedure follows an initial context setup request procedure as described in 38.413 (and reproduced in FIG. 11).

For establishment of a protocol data unit (PDU) session, the 5GC is prepared to receive user data before the INITIAL CONTEXT SETUP RESPONSE message has been received by the AMF. If no UE-associated logical NG-connection exists, the UE-associated logical NG-connection is established at reception of the INITIAL CONTEXT SETUP REQUEST message.

The INITIAL CONTEXT SETUP REQUEST message contains the Index to RAT/Frequency Selection Priority IE, if available in the AMF. If the NAS-PDU IE is included in the INITIAL CONTEXT SETUP REQUEST message, the NG-RAN node passes it transparently towards the UE. If the Masked IMEISV IE is contained in the INITIAL CONTEXT SETUP REQUEST message, the target NG-RAN node will, if supported, use it to determine the characteristics of the UE for subsequent handling.

Upon receipt of the INITIAL CONTEXT SETUP REQUEST message the NG-RAN node: (a) attempts to execute the requested PDU session configuration; (b) stores the received UE Aggregate Maximum Bit Rate in the UE context and uses the received UE Aggregate Maximum Bit Rate for non-GBR Bearers for the concerned UE; (c) stores the received Mobility Restriction List in the UE context; (d) store the received UE Radio Capability in the UE context; (e) stores the received Index to RAT/Frequency Selection Priority in the UE context and uses it as defined in TS 23.501; (f) stores the received UE Security Capabilities in the UE context; and (g) stores the received Security Key in the UE context and, if the NG-RAN node is required to activate security for the UE, uses the security key.

The capability information included may be explicit UE radio capability information, it may be explicit information in combination with a UE Capability ID, or it may only be a UE Capability ID.

In step 610, gNB checks if it is receiving relevant UE capability information from the AMF. The information can thus, according to some embodiments, be included as explicit UE capability information or it can be represented with a UE Capability ID in the context request message. If only a UE capability ID is included in the request message, the gNB translates it into relevant UE capability information typically through an internal mapping database that map UE capability ID to UE radio capability information.

If the gNB concludes in step 610 that relevant capability information is included in step 600 (in the request message), then the gNB stores the information for the UE in a context (step 620). In some situations, the gNB may have received new information that is not present in its internal mapping database. For example, capabilities for new bands not previously stored in the gNB may have been signaled from the AMF. Then, in step 630, the gNB may update its database with the acquired information.

If, on the other hand, the gNB concludes in step 610 that the context setup request message from the AMF does not include necessary or relevant capability information, or it is not possible to extract such relevant information from index indications, then the gNB in step 640 may request information from the UE. The gNB may do this using the capabilityEnquiry procedure described above. Typically, the procedure is not triggered if the context setup request information in step 600 is sufficient. In step 640, according to some embodiments, only capability information that is relevant for a particular situation or gNB can be requested.

In step 650, the gNB has requested and received additional capability information from the UE for which the context setup request in step 600 applied. It may store the UE capability information for the UE context in the gNB.

According to some embodiments, the information sent from the UE may contain explicit UE capability information in combination with a UE capability ID. In step 650, the gNB may thus store both the explicit UE capability information as well as the UE capability ID for the UE context.

In addition, in step 660, the gNB may also update the AMF with the capability information received from the UE in step 640. It would typically then also include a UE capability ID, for the AMF to associate with explicit UE Capability information. The AMF may store the UE capability ID as well as the associated new UE capability information for this UE context as well as for any mapping database that the AMF may have or have access to. To signal these capabilities, the procedures described for UE RADIO CAPABILITY INFO INDICATION will be used by the gNB and AMF, see above.

According to some embodiments, the mapping between UE Capability ID and UE capability information (or UE Radio Capability information) can be incrementally built-up, using the procedures above. If the above procedures end up in that storing of UE-capability ID-to-UE-Capability information mapping for a certain set of frequency bands for example, this is to be seen as a fraction of the complete definition of the UE capability ID to Information mapping. This incremental build-up can be used in mapping databases in the gNB or in the AMF or both.

It should also be recognized that in step 600 above, it may be that the AMF provides both UE capability ID as well as UE capability Information that the gNB can combine with its own knowledge of mapping to update its own mapping table. The mappings need not be UE context specific but can be generic and used for whenever a UE with a certain UE capability ID arrives. The gNB may not have the full set of UE capability ID to UE capability information data, as the AMF is likely updated by several gNBs.

The signaling of context setup request in step 600 may provide UE capability information that is not relevant for the gNB. This is because UE capability information is not interpreted by AMF, only stored. Thus, the AMF may provide its complete information for a certain UE capability ID.

The gNB, however, may not need to process all the capability information, because the gNB may have stored its own version of UE capability ID to UE capability information mapping that includes what is relevant for the particular gNB. In such situations, it is sufficient to check the actual UE Capability ID and then retrieve necessary information locally if there is a mapping database in the gNB.

Thus, from the AMF perspective, if it includes UE radio capability information in the request message to the UE, it may still receive new capability information in return, in particular to update any generic mapping database for UE Capability ID to UE radio capability information. It may also be that capability information for particular UEs are also updated, as they may be created using UE Capability ID's that are not fully defined and therefore complemented using the procedures above.

It should thus be recognized that both in the AMF and in the gNB there may be storage of UE capability data according to the following mappings. In some embodiments, the gNB may include a generic mapping database that includes UE Capability ID-to-UE radio capability information mapping. The mapping database may be gradually updated and complemented with, e.g., more and more relevant band combinations for the particular gNB. In some embodiments, the gNB may include UE specific capability information. The US specific information may include both a UE capability ID and relevant explicit UE capability information.

In some embodiments, the AMF may include a generic mapping database, that includes UE Capability ID-to-UE radio capability information mapping. The mapping database may be gradually updated and complemented from all connected gNBs with, e.g., more and more data. As more and more data is added, the mapping approaches UE Capability ID to full UE radio capability information. In some embodiments, the AMF may include UE specific capability information. The information may include both a UE capability ID and relevant explicit UE radio capability information.

In some embodiments, the generic mapping databases and the knowledge in the network about what a UE capability ID means are gradually built-up in increments, where increments typically come from requests to specific UEs in certain gNBs.

Figure 12:
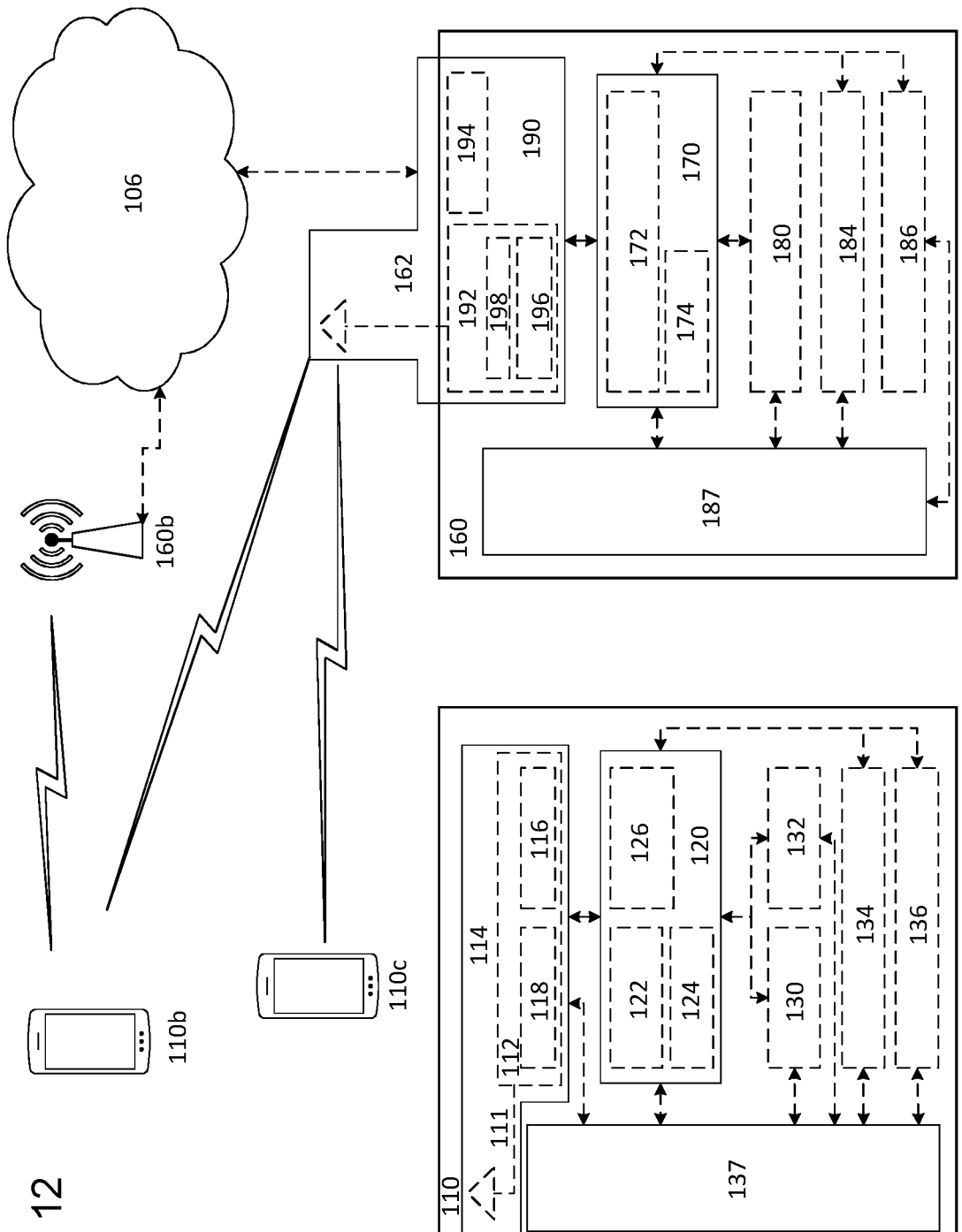
FIG. 12 is a block diagram illustrating an example wireless network.

FIG. 12 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations.

A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node 160 includes processing circuitry 170, device readable medium 180, interface 190, auxiliary equipment 184, power source 186, power circuitry 187, and antenna 162. Although network node 160 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 12 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 13:
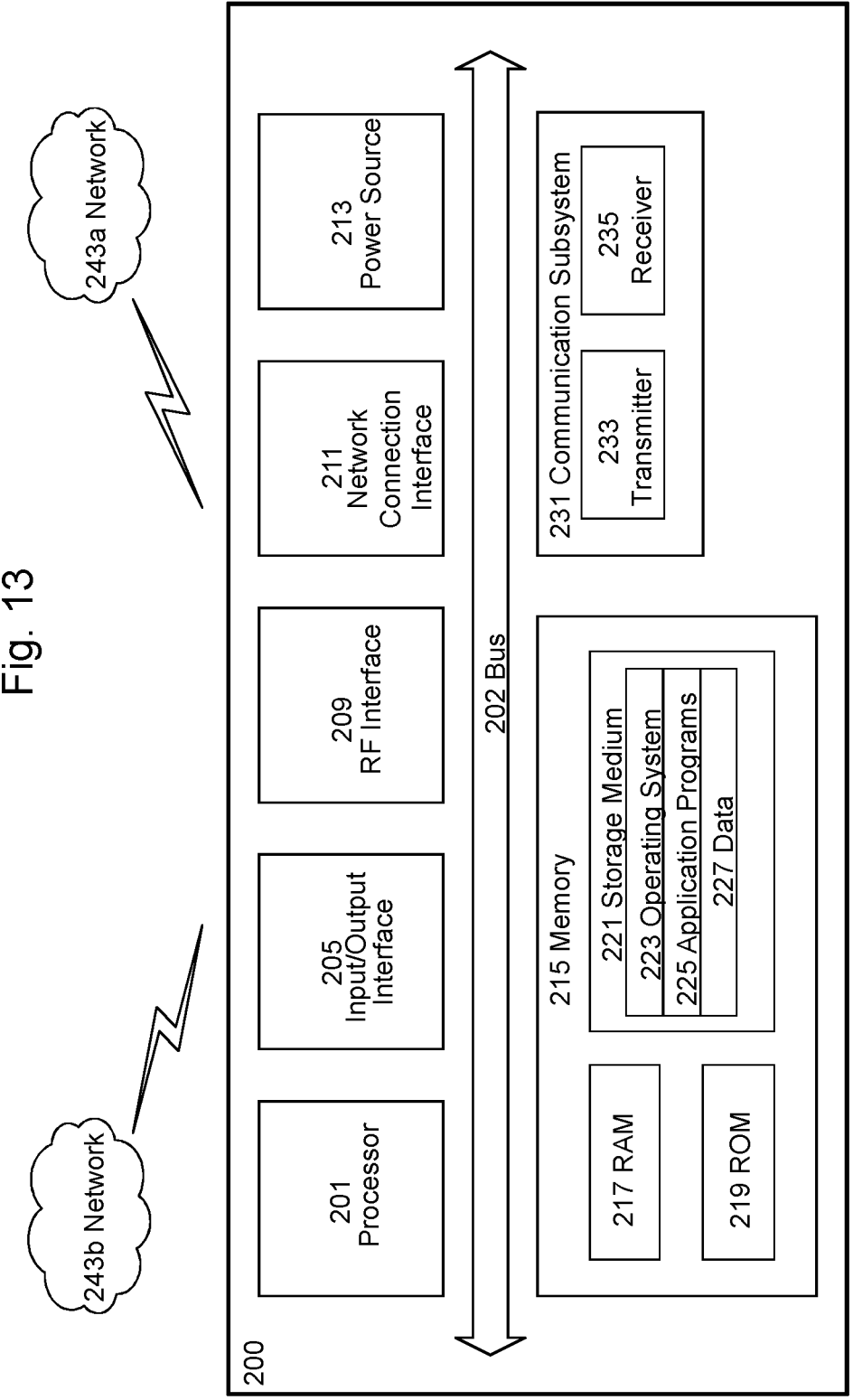
FIG. 13 illustrates an example user equipment, according to certain embodiments.

FIG. 13 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 13, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may use all the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 13, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 14:
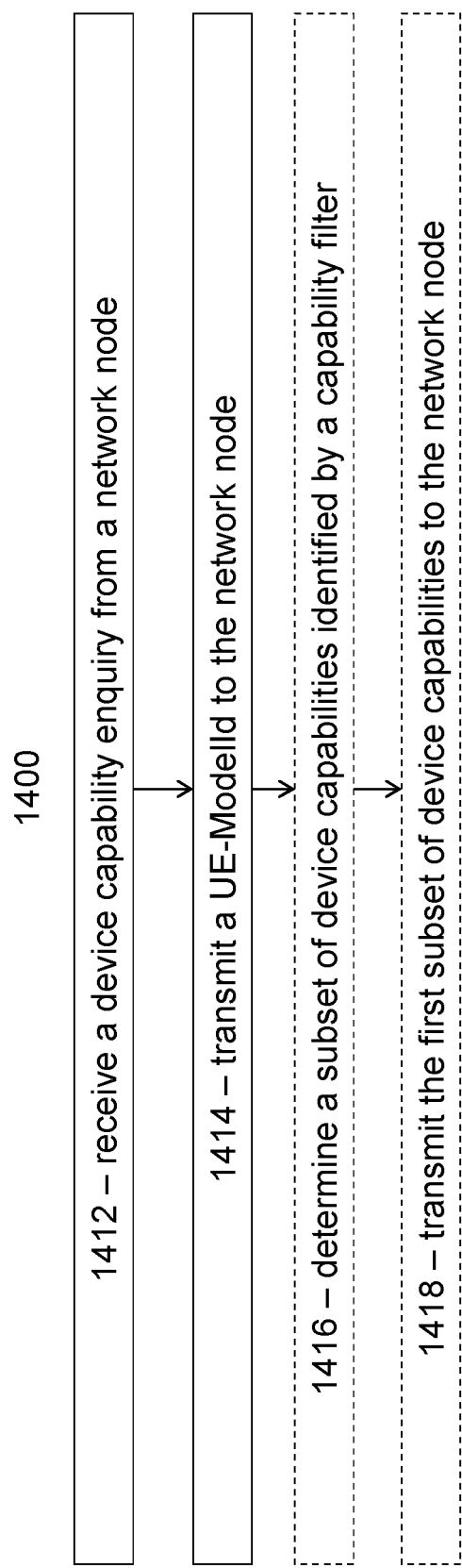
FIG. 14 is flowchart illustrating an example method in a wireless device, according to certain embodiments.

FIG. 14 is a flowchart illustrating an example method in a wireless device, according to certain embodiments. In particular embodiments, one or more steps of FIG. 14 may be performed by wireless device 110 described with respect to FIG. 12.

The method may begin at step 1412, where the wireless device (e.g., wireless device 110) receive a capability enquiry from a network node. For example, wireless device 110 may receive a RRC capability enquiry from network node 160.

At step 1414, in response to the enquiry at step 1412, the wireless device may transmit a UE-ModelId to the network node. For example, wireless device 110 may be associated with a UE-ModelId that is associated with a UE-ModelId. The UE-ModelId identifies a set of device capabilities for all wireless devices that share the same UE-ModelId. By transmitting the UE-ModelId, the wireless device is able to significantly reduce the amount of data transmitted to the network node, compared to transmitting all device capability information to the network node. In some embodiments, the wireless device may transmit the UE-ModelId and a subset of device capability information associated with the UE-ModelId.

If the network node already has a mapping for the UE-ModelId, then the network node may not need any additional capability information from the wireless device. If the network node does not have a mapping for the UE-ModelId, or the mapping does have device capability information relevant for the network node, then the network node may send another device capability enquiry to the wireless device. In which case the method returns to step 1412.

Returning to step 1412, the received device capability enquiry may include a capability filter. For example, the capability filter may identify a subset of device capabilities relevant to the network node, such as RAT types associated with the network node or bandwidth combinations supported by the network node.

At step 1416, the wireless device may determine a subset of device capabilities identified by the capability filter (e.g., device capabilities based on RAT type, bandwidth combinations, or any other suitable filter).

At step 1418, the wireless device may transmit the subset of device capabilities to the network node. For example, wireless device 110 may transmit the subset of device capabilities to network node 120. Transmitting the relevant subset of device capabilities is more bandwidth efficient than transmitting a complete set of device capabilities.

In particular embodiments, the wireless device may receive a second device capability enquiry from a second network node. The wireless device may repeat one or more of steps 1412-1418 with respect to the second network node. The second network node may receive a different set of device capabilities from the wireless device. The second network node may share the device capabilities with an AMF. The AMF may combine the device capabilities form the first network node and the second network node to incrementally build a complete set of device capabilities associated with the UE-ModelId.

Modifications, additions, or omissions may be made to method 1400 of FIG. 14. Additionally, one or more steps in the method of FIG. 14 may be performed in parallel or in any suitable order.

Figure 15:
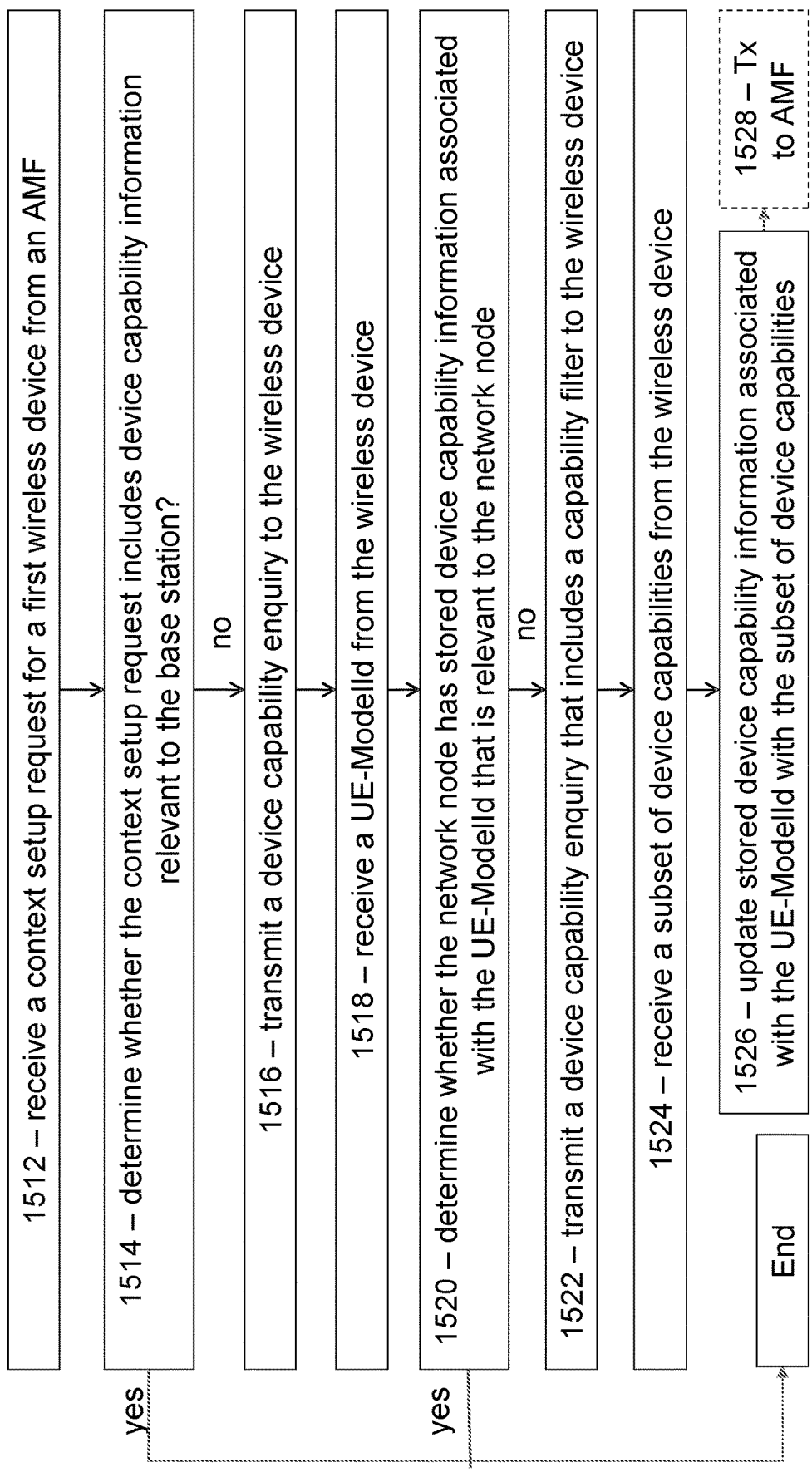
FIG. 15 is a flowchart illustrating an example method in a network node, according to certain embodiments.

FIG. 15 is a flowchart illustrating an example method in a network node, according to certain embodiments. In particular embodiments, one or more steps of FIG. 15 may be performed by network node 160 described with respect to FIG. 12.

Figure 1:
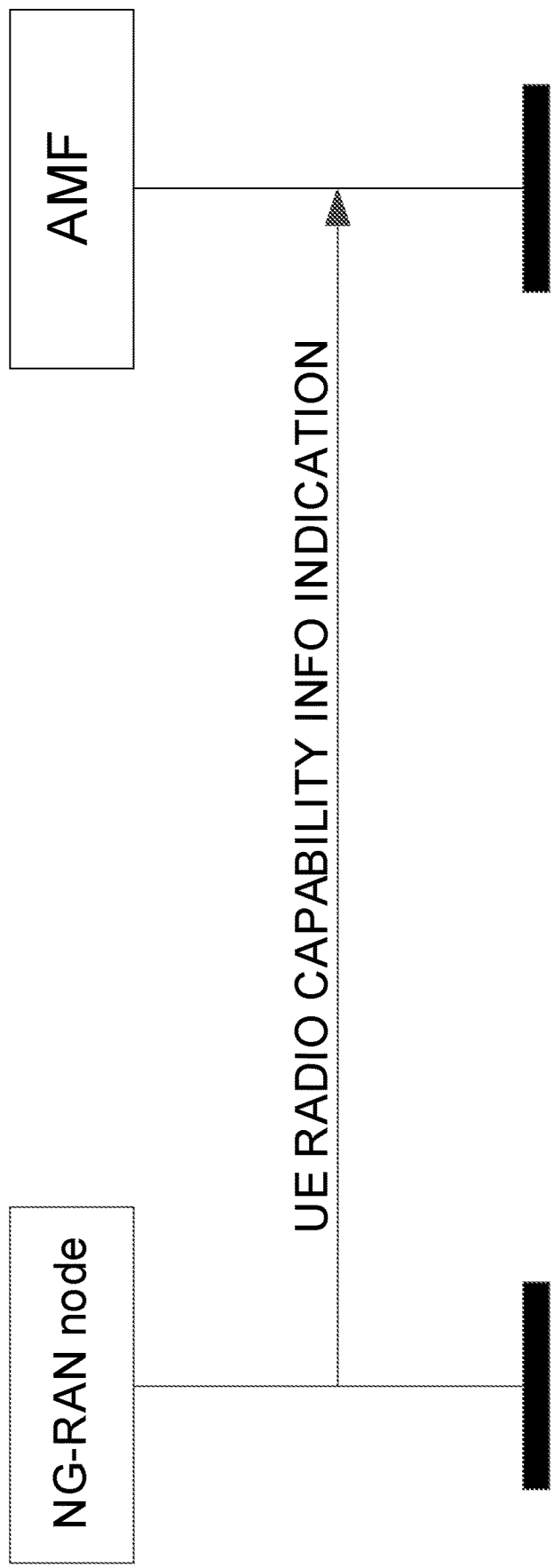
FIG. 1 is a sequence diagram illustrating an example UE radio capability management procedure.
Figure 2:
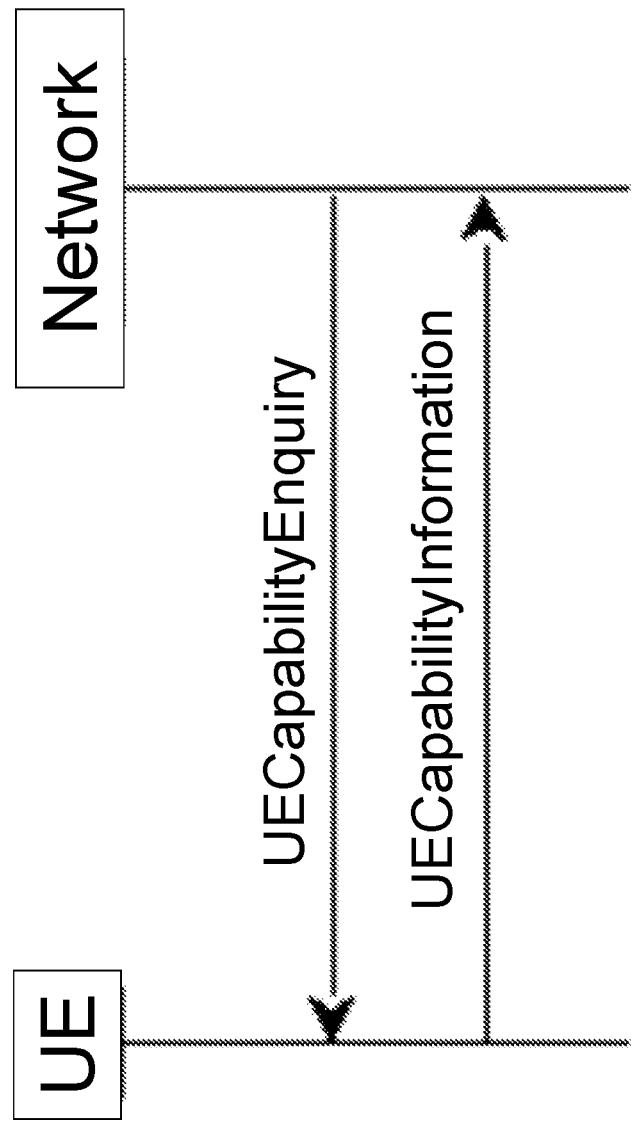
FIG. 2 is a sequence diagram illustrating an example UE capability transfer procedure.
Figure 3:
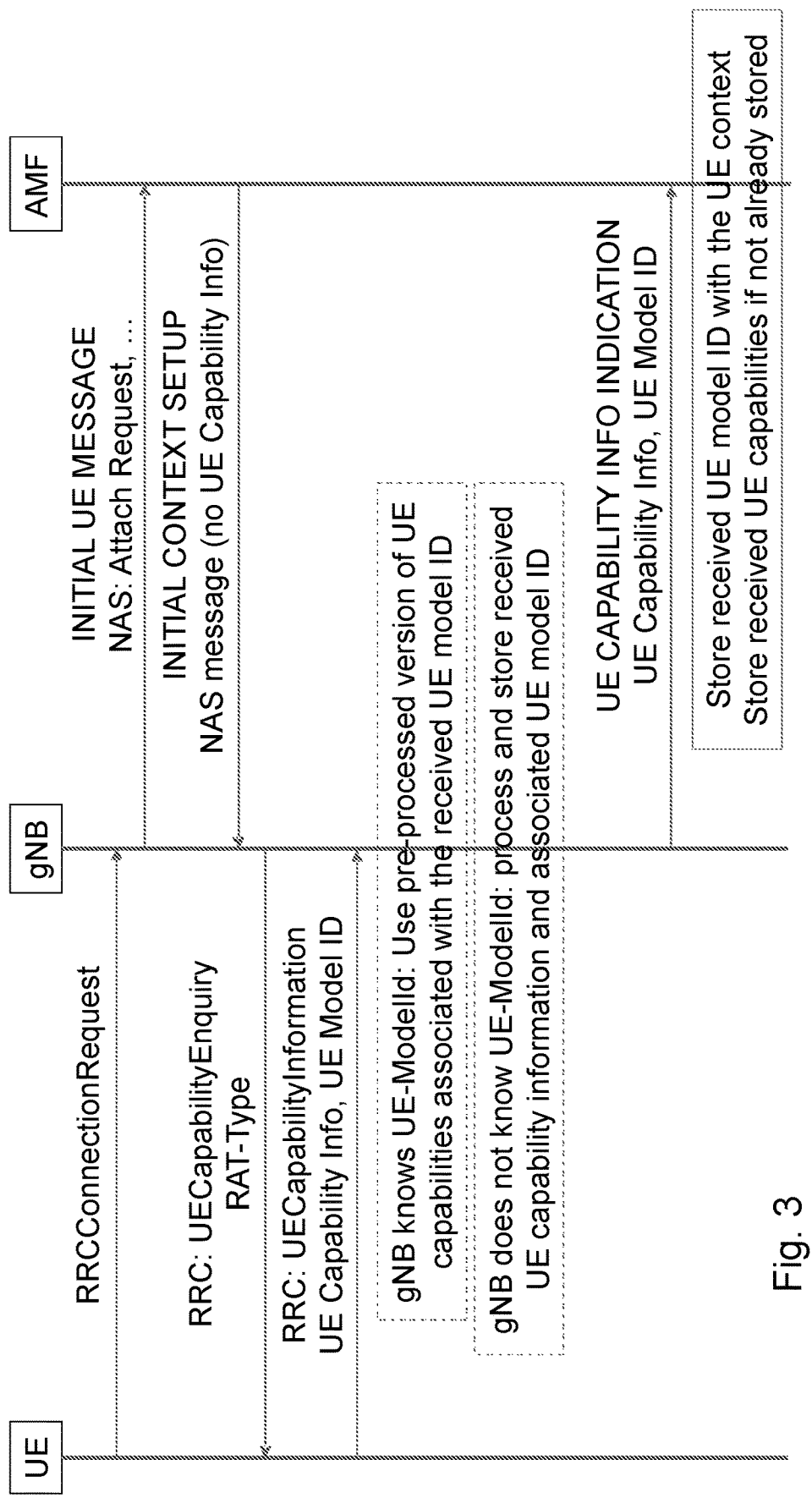
FIG. 3 is a sequence diagram illustrating an example connection procedure when the AMF does not provide UE capabilities to the gNB.
Figure 4A:
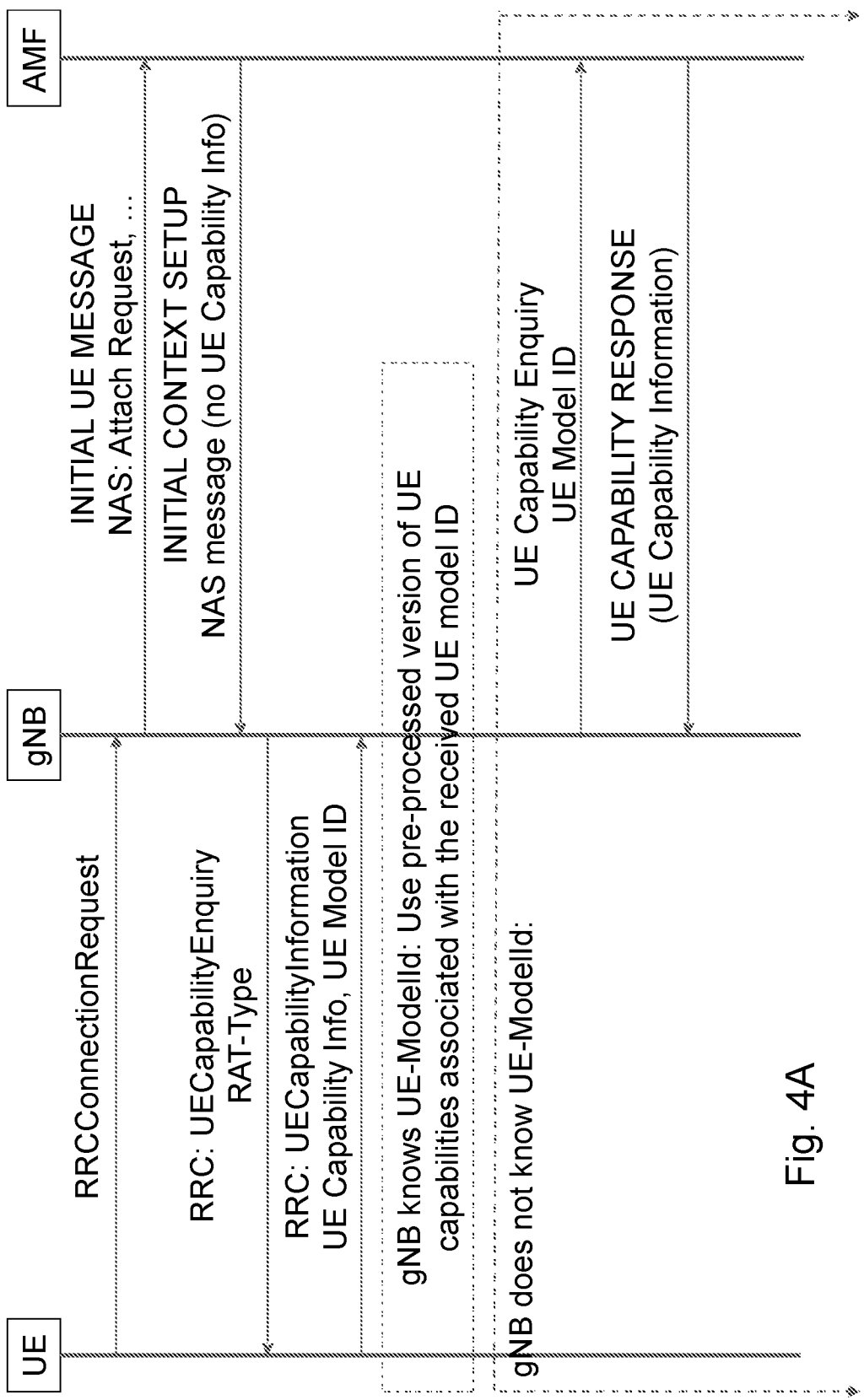
FIGS. 4A and 4B are a sequence diagram illustrating another example connection procedure when the AMF does not provide UE capabilities to the gNB.
Figure 4B:
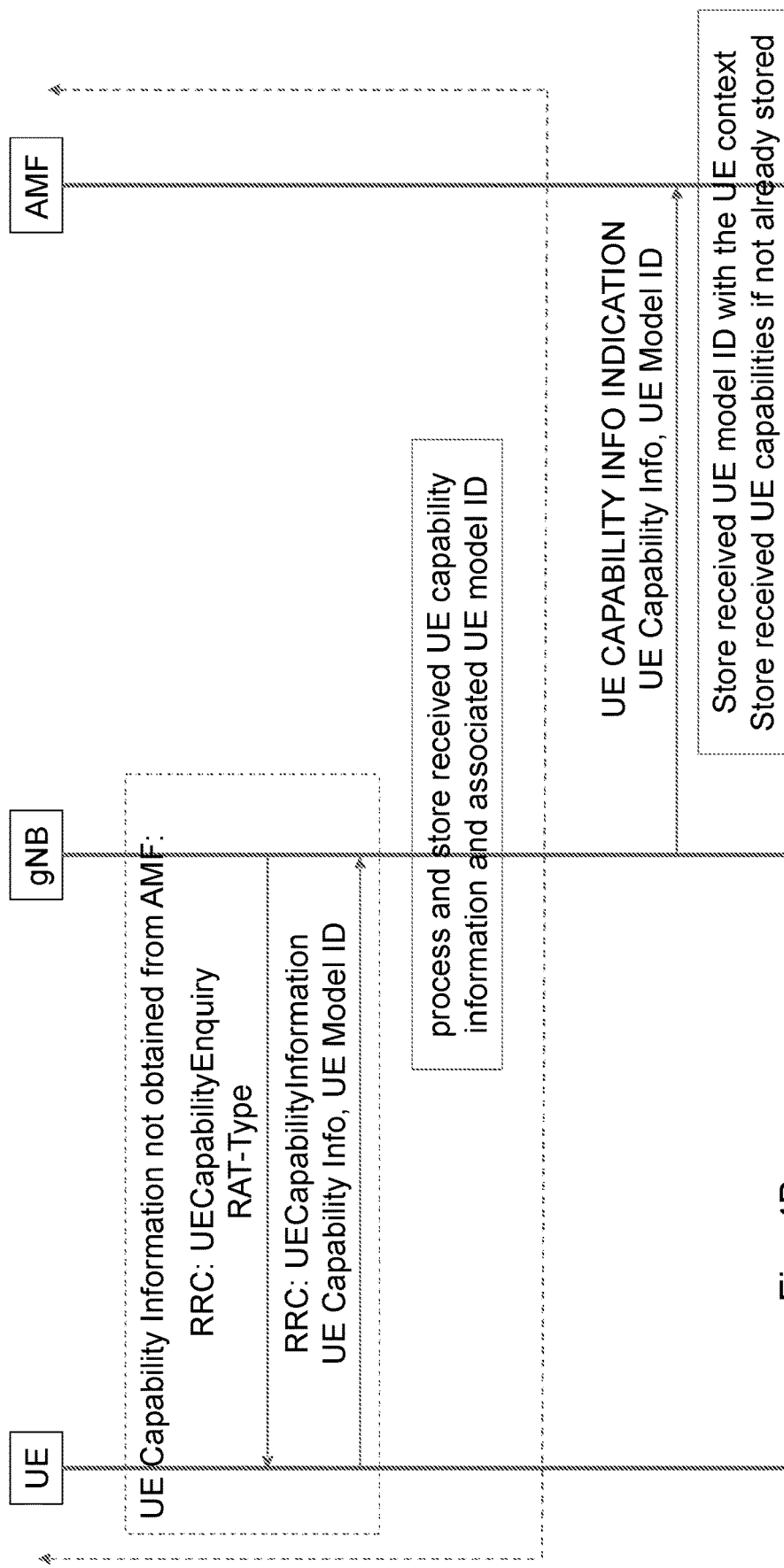
Figure 5:
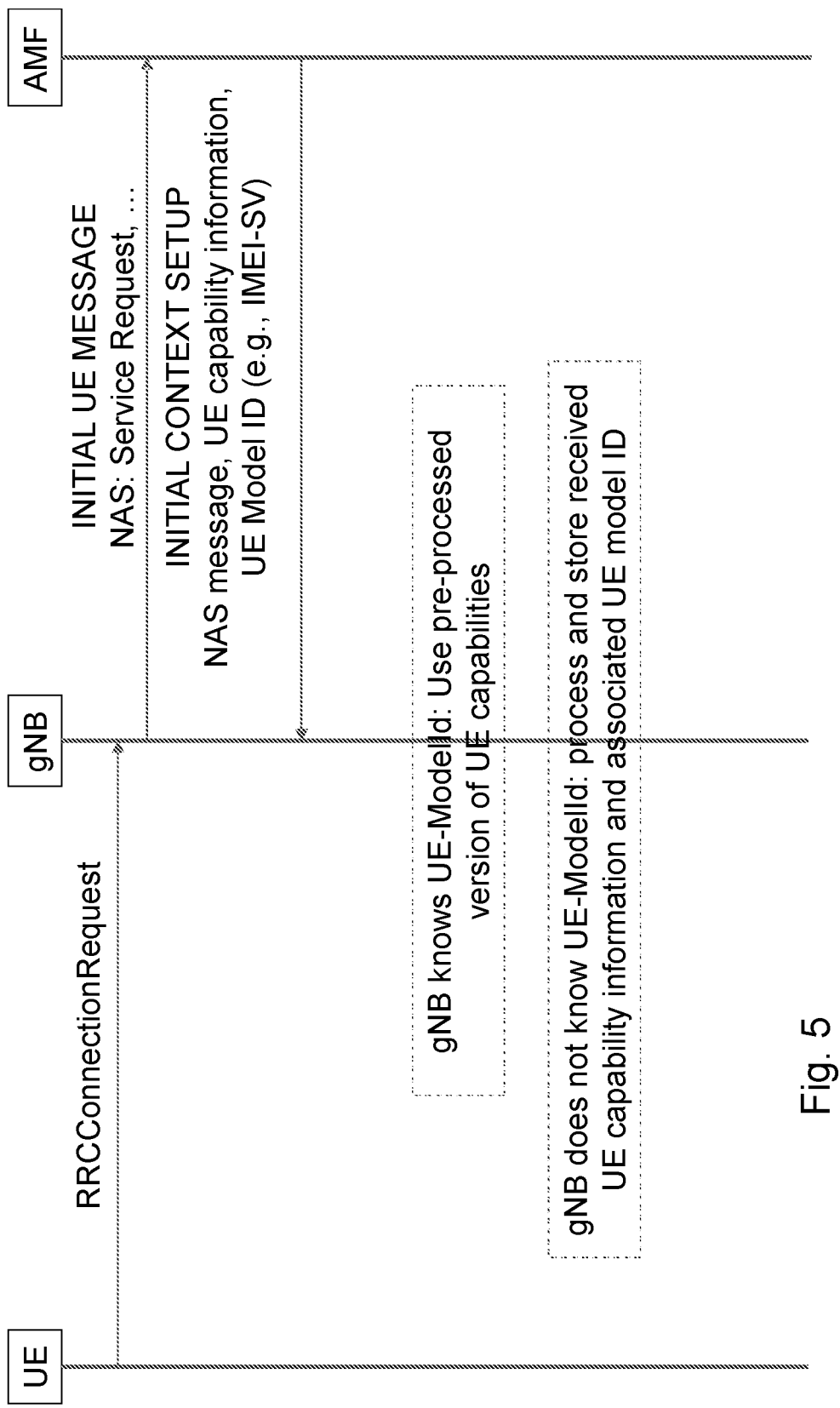
FIG. 5 is a sequence diagram illustrating an example connection procedure where the AMF provides UE capabilities to the gNB.
Figure 6:
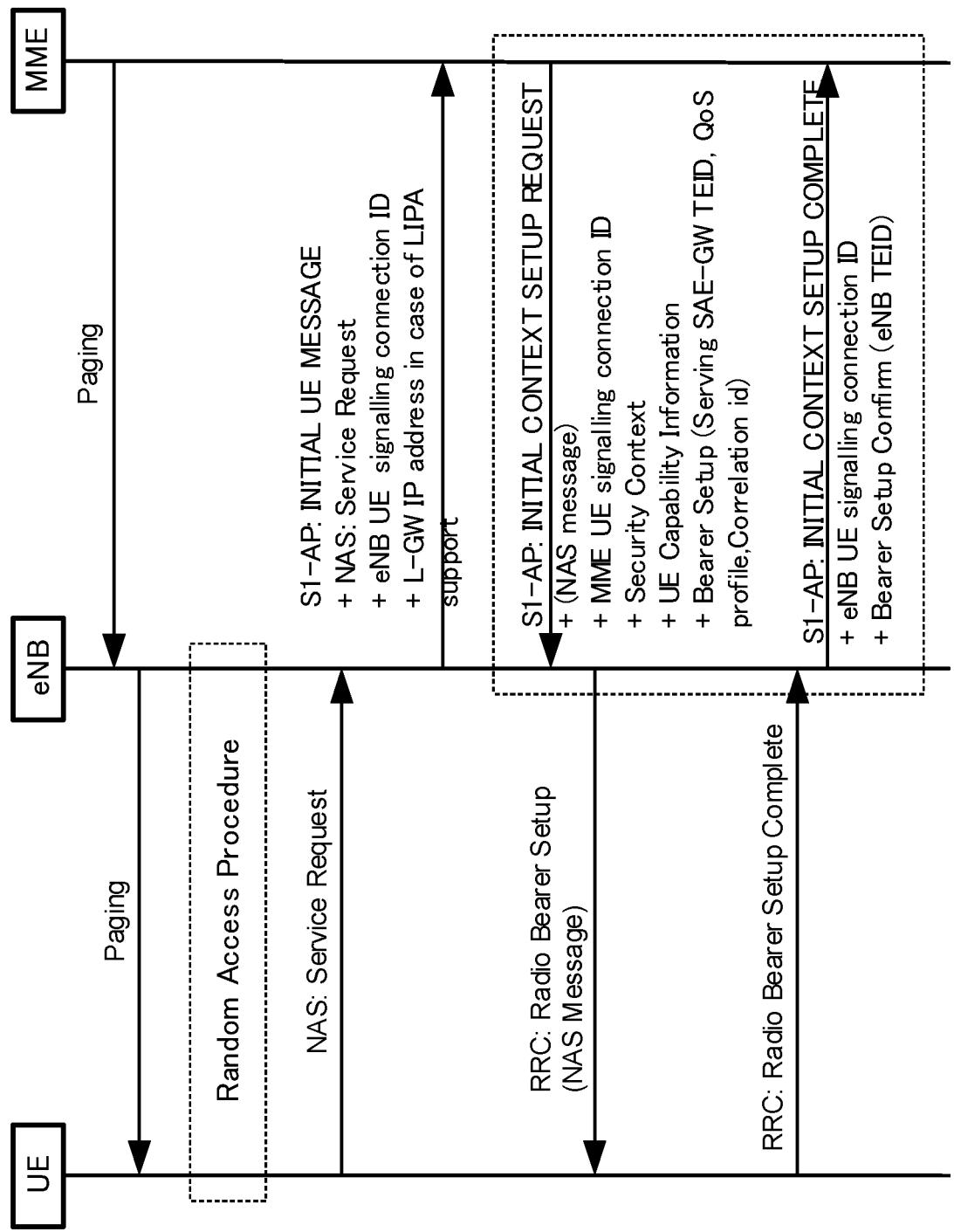
FIG. 6 is a sequence diagram illustrating an example E-UTRA Initial Context Setup procedure in an Idle-to-Active procedure.
Figure 7:
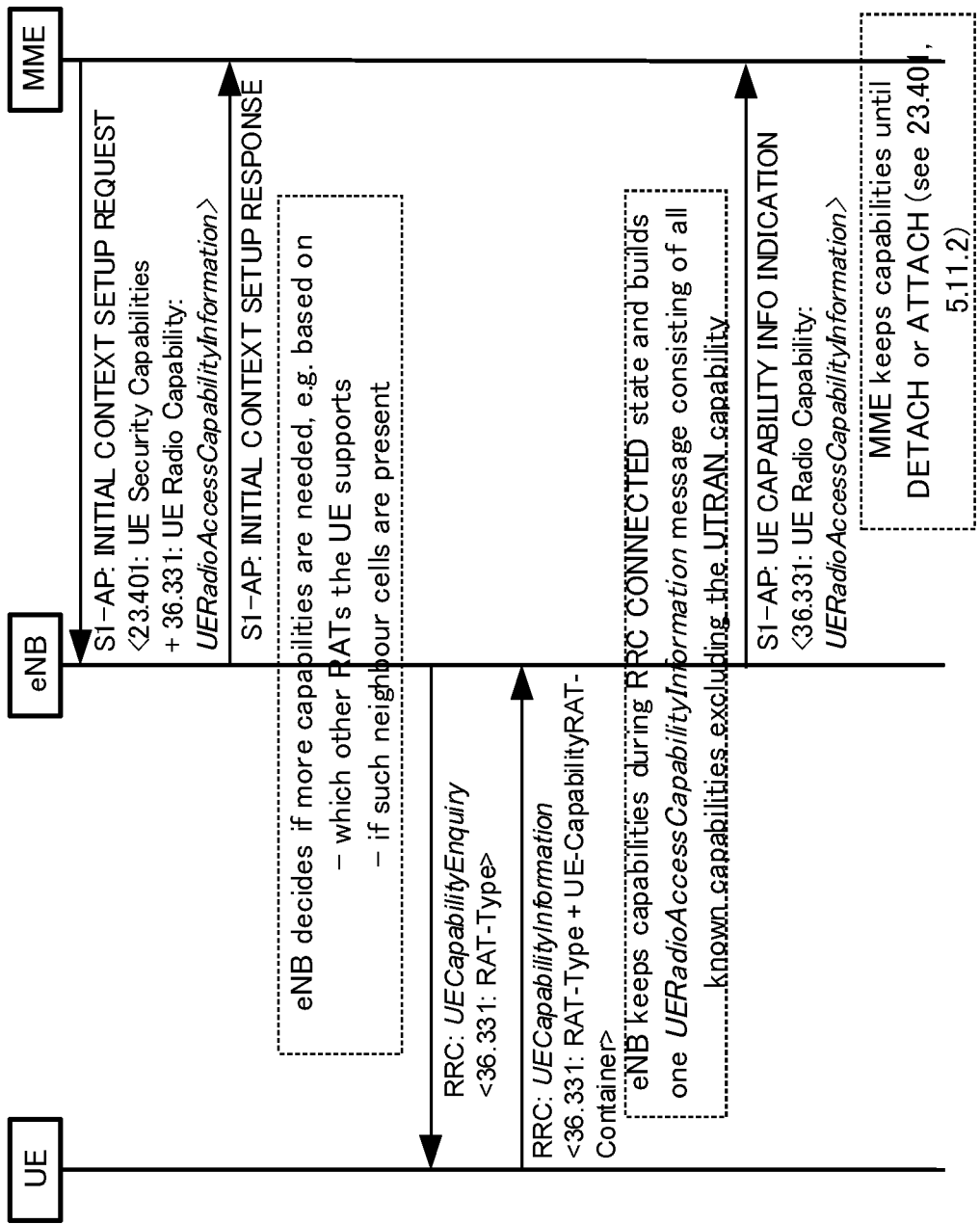
FIG. 7 is a sequence diagram illustrating an example Initial UE Capability Handling procedure.

The method may begin at step 1512, where the network node (e.g., network node 160) receives a context setup request for a wireless device (e.g., wireless device 110) from an AMF. The context setup request is similar to the context setup request illustrated in FIGS. 6 and 7.

At step 1514, the network node determines whether the context setup request includes device capability information relevant to the network node. In this context, whether the device capability information is relevant to the network node refers to whether the device capability information is applicable based on the characteristics of the network node.

For example, the network node may operate according to one or more RAT types and/or one or bandwidth combinations. If the device capabilities refer to one of the same RAT types and/or bandwidth combinations, then the device capabilities are relevant to the network node. If the device capabilities refer to an unsupported RAT type and/or bandwidth combination, then the device capabilities are not relevant to the network node.

If the network node determines the context setup request includes the relevant device capability information, then the method is complete, and the network node may use the device capability information accordingly. If the context setup request does not include the relevant device capability information, then the method continues to step 1516.

At step 1516, the network node transmits a device capability enquiry to the wireless device. At step 1518, the network node receives a UE-ModelId from the wireless device. The UE-ModelId identifies a set of device capabilities for all wireless devices that share the same UE-ModelId. In some embodiments, the network node may receive the UE-ModelId and a subset of device capabilities associated with the UE-ModelId.

At step 1520, the network node determines whether the network node has stored device capability information associated with the UE-ModelId that is relevant to the network node. If the network node already has device capability information associated with the UE-ModelId that is relevant to the network node, then the method is complete, and the network node may use the device capability information accordingly. If the network node does not have device capability information associated the UE-ModelId, or whatever device capability information is associated with the UE-ModelId is not relevant to the network node, then the method continues to step 1522.

At step 1522, the network node transmits a device capability enquiry to the wireless device. The device capability enquiry includes a capability filter that identifies capability information relevant to the network node. For example, the capability filter may indicate a RAT type, a bandwidth combination, or any other suitable attribute or combination of attributes.

At step 1524, the network node receives a subset of device capabilities identified by the capability filter from the wireless device. At step 1526, the network node updates the stored device capability information associated with the UE-ModelId with the subset of device capabilities. In this manner, network node may incrementally create the complete set of device capabilities associated with a UE-ModelId.

At step 1528, the network node may transmit the UE-ModelId and the first subset of device capabilities to the AMF.

In some embodiments, the network node may repeat one or more of steps 1512-1528 with one or more other wireless devices that shares the same UE-ModelId. The network node may update the device capability information associated with the UE-ModelId based on device capability information received from the other wireless devices.

Modifications, additions, or omissions may be made to method 1500 of FIG. 15. Additionally, one or more steps in the method of FIG. 15 may be performed in parallel or in any suitable order.

Figure 16:
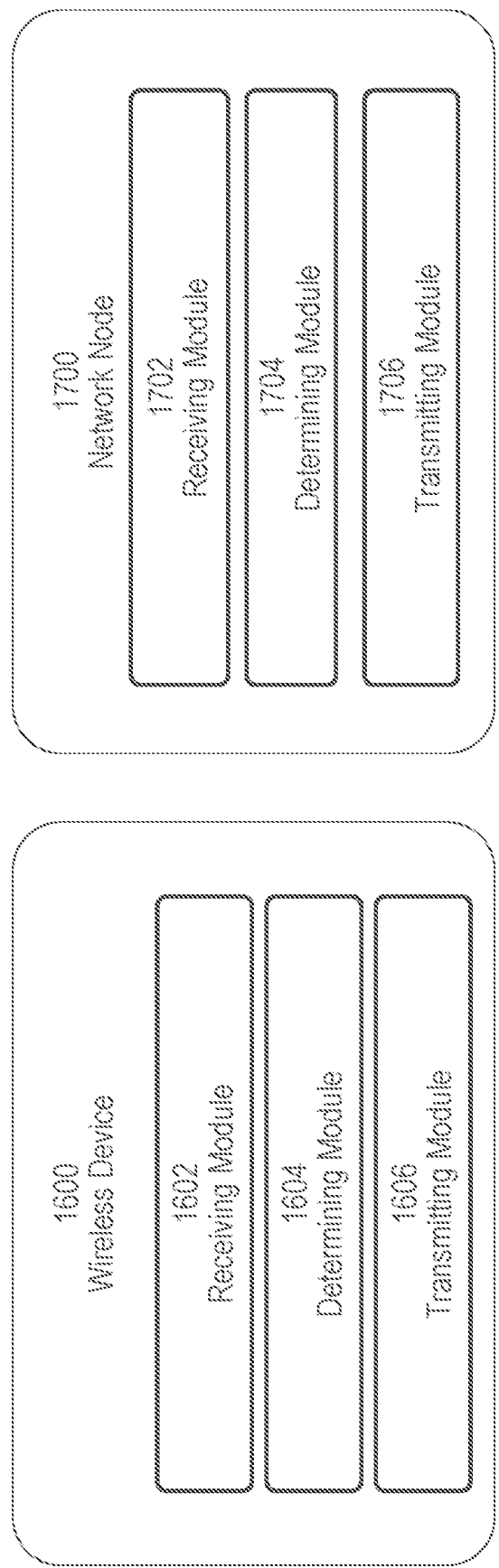
FIG. 16 illustrates a schematic block diagram of a wireless device and network node in a wireless network, according to certain embodiments.

FIG. 16 illustrates a schematic block diagram of two apparatuses in a wireless network (for example, the wireless network illustrated in FIG. 12). The apparatuses include a wireless device and a network node (e.g., wireless device 110 and network node 160 illustrated in FIG. 12). Apparatuses 1600 and 1700 are operable to carry out the example methods described with reference to FIGS. 14 and 15, respectively, and possibly any other processes or methods disclosed herein. It is also to be understood that the methods of FIGS. 14 and 15 are not necessarily carried out solely by apparatus 1600 and/or apparatus 1700. At least some operations of the method can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause receiving module 1602, determining module 1604, transmitting module 1606, and any other suitable units of apparatus 1600 to perform corresponding functions according one or more embodiments of the present disclosure. Similarly, the processing circuitry described above may be used to cause receiving module 1702, determining module 1704, transmitting module 1706, and any other suitable units of apparatus 1700 to perform corresponding functions according one or more embodiments of the present disclosure.

As illustrated in FIG. 16, apparatus 1600 includes receiving module 1602 configured to receive device capability enquiries, according to any of the embodiments and examples described herein. Apparatus 1600 also includes determining module 1604 configured to determine a subset of device capabilities identified by a capability filter, according to any of the embodiments and examples described herein. Transmitting module 1606 is configured to transmit a UE-ModelId and/or device capability information to a network node, according to any of the embodiments and examples described herein.

As illustrated in FIG. 16, apparatus 1700 includes receiving module 1702 configured to receive context setup requests from an AMG and receive UE-ModelId and/or device capability information from a network node, according to any of the embodiments and examples described herein. Apparatus 1700 also includes determining module 1704 configured to determine whether a context setup request includes device capability information relevant to the base station and/or whether the network node has relevant device capability information associated with a UE-ModelId, according to any of the embodiments and examples described herein. Transmitting module 1706 is configured to transmit device capability enquiries to a wireless device and to transmit UE-ModelId and/or device capability information to an AMF, according to any of the embodiments and examples described herein.

Figure 17:
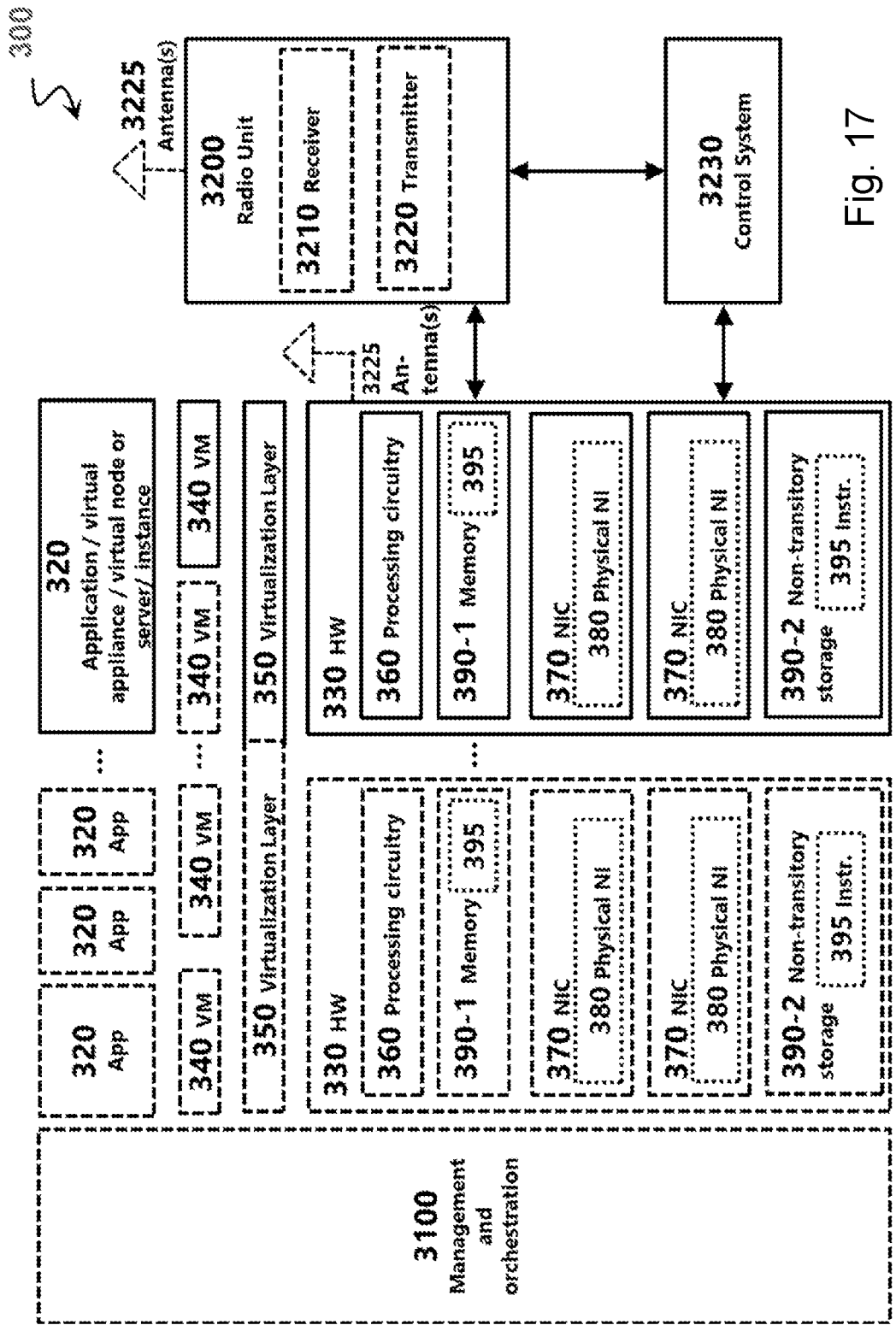
FIG. 17 illustrates an example virtualization environment, according to certain embodiments.

FIG. 17 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 17, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Figure 18:
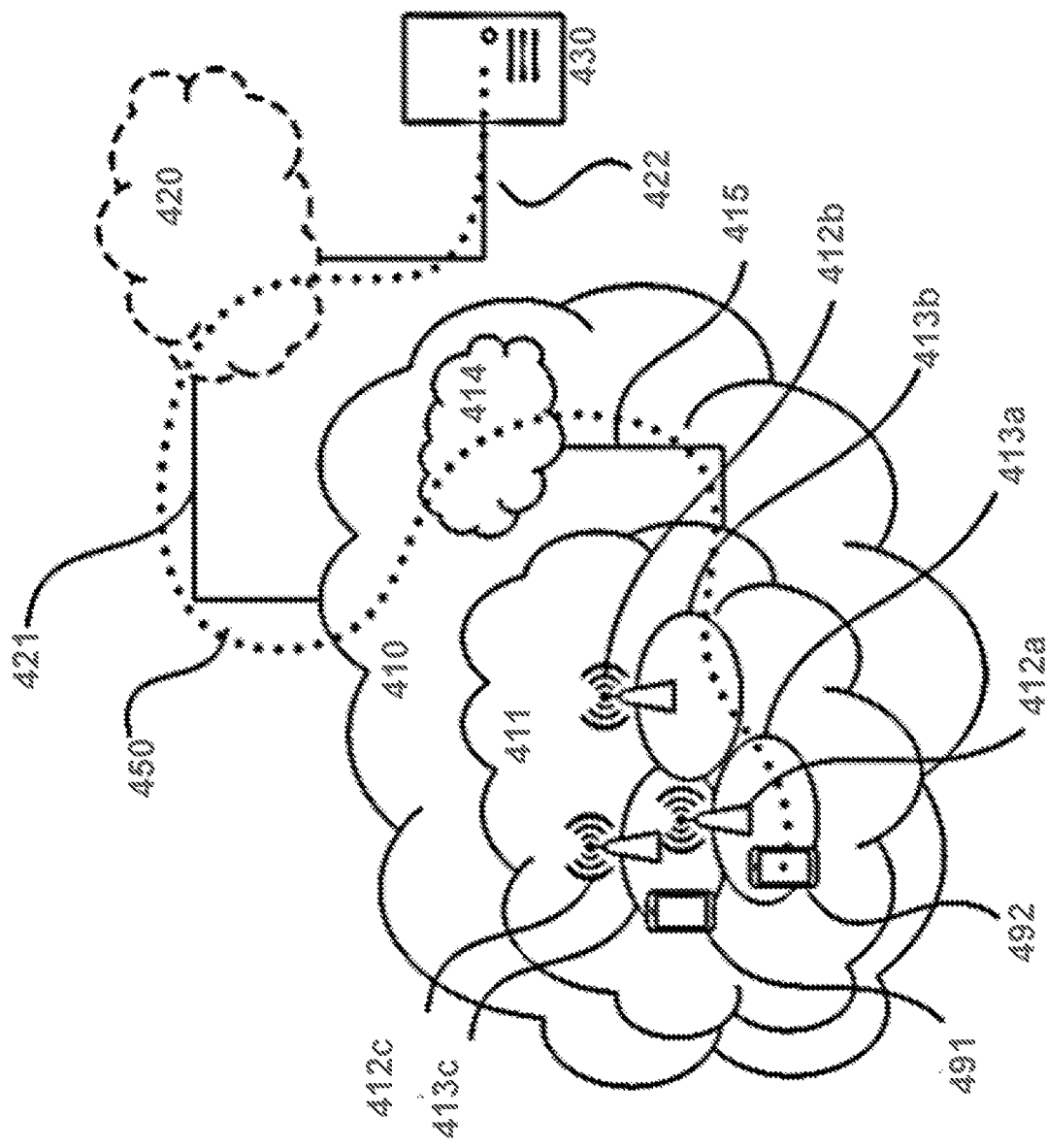
FIG. 18 illustrates an example telecommunication network connected via an intermediate network to a host computer, according to certain embodiments.

Still in the context of NFV, Virtual Network Function (VNF) is responsible for handling specific network functions that run in one or more virtual machines 340 on top of hardware networking infrastructure 330 and corresponds to application 320 in FIG. 18.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

With reference to FIG. 18, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 18 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 19:
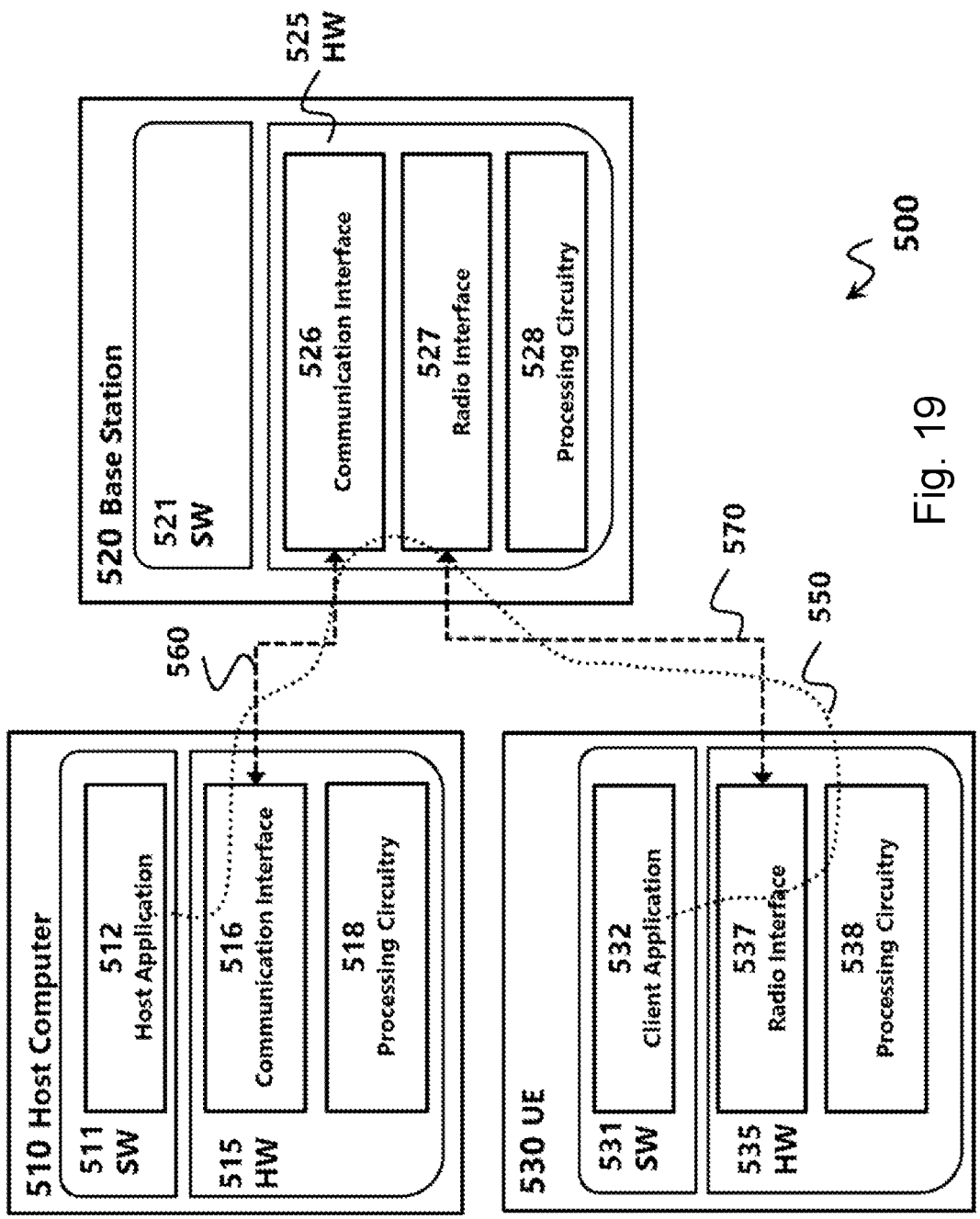
FIG. 19 illustrates an example host computer communicating via a base station with a user equipment over a partially wireless connection, according to certain embodiments.

FIG. 19 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 19. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 19) served by base station 520. Communication interface 526 may be configured to facilitate connection 560 to host computer 510. Connection 560 may be direct, or it may pass through a core network (not shown in FIG. 19) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 19 may be similar or identical to host computer 430, one of base stations 412a, 412b, 412c and one of UEs 491, 492 of FIG. 18, respectively. This is to say, the inner workings of these entities may be as shown in FIG. 19 and independently, the surrounding network topology may be that of FIG. 18.

In FIG. 19, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, and thereby provide benefits such as reduced user waiting time, better responsiveness and extended battery life.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 20:
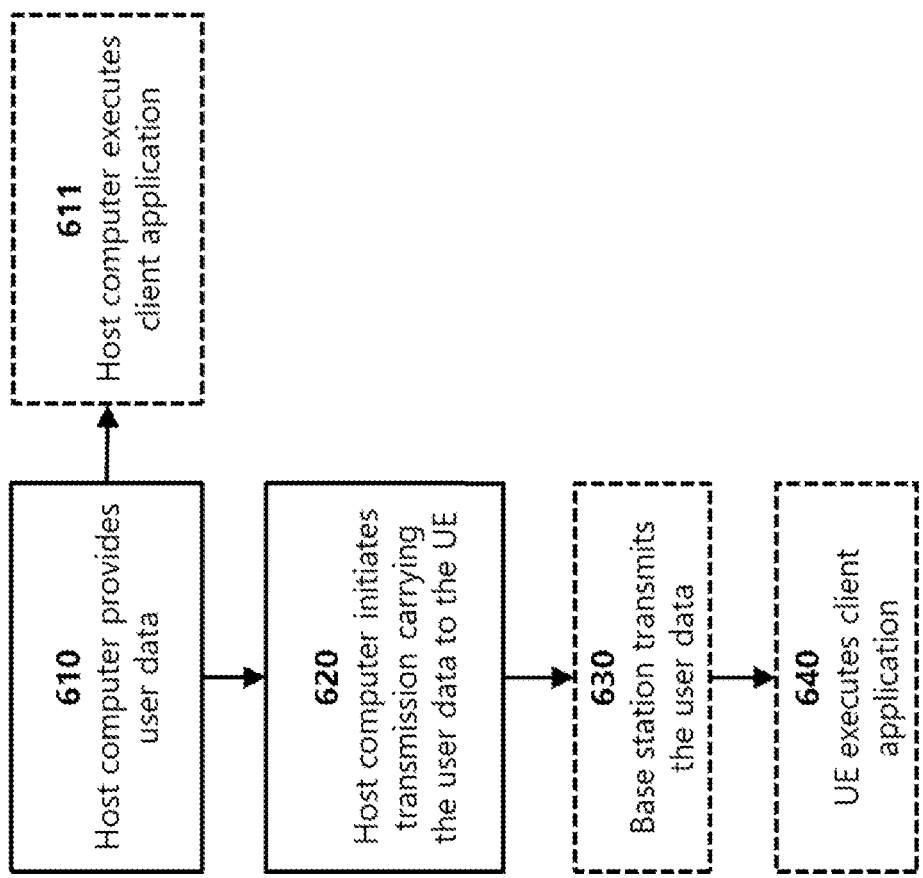
FIG. 20 is a flowchart illustrating a method implemented, according to certain embodiments.

FIG. 20 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 20 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 21:
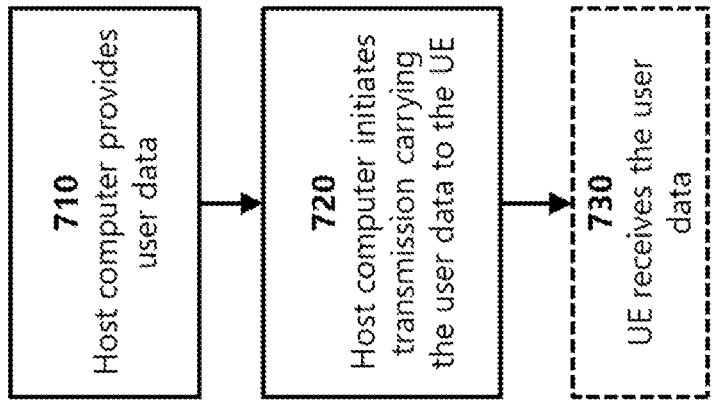
FIG. 21 is a flowchart illustrating a method implemented in a communication system, according to certain embodiments.

FIG. 21 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 21 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 22:
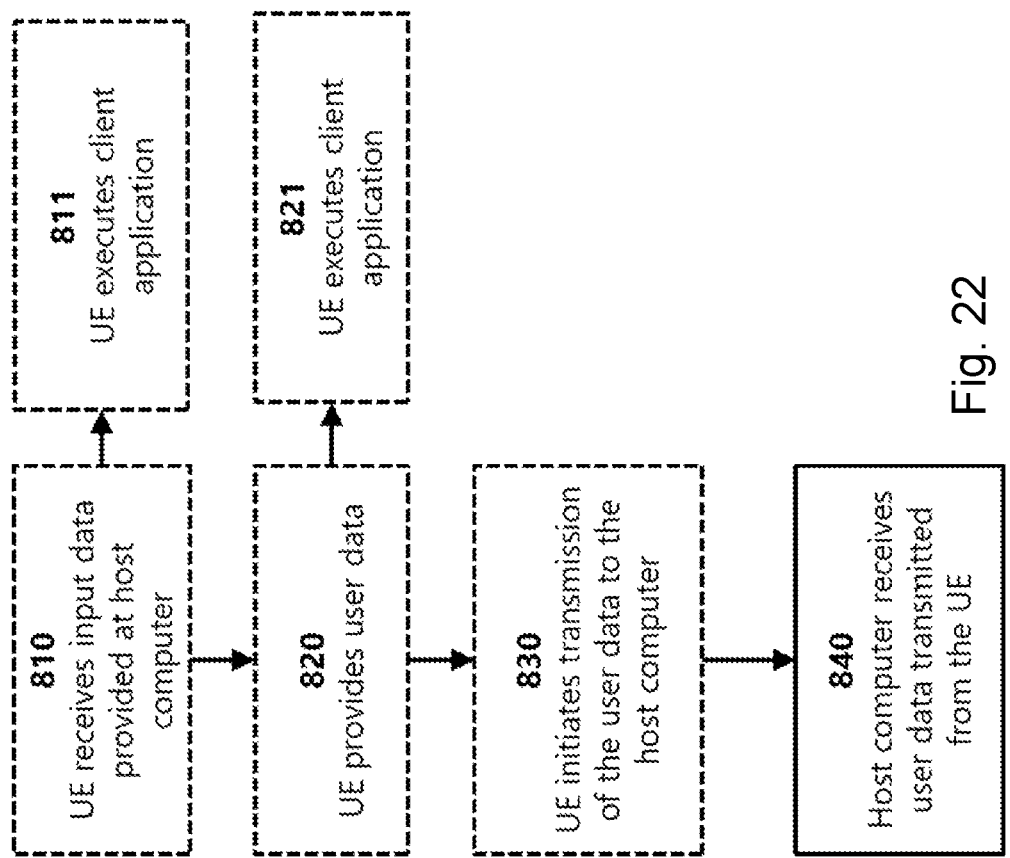
FIG. 22 is a flowchart illustrating a method implemented in a communication system, according to certain embodiments.

FIG. 22 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 22 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 23:
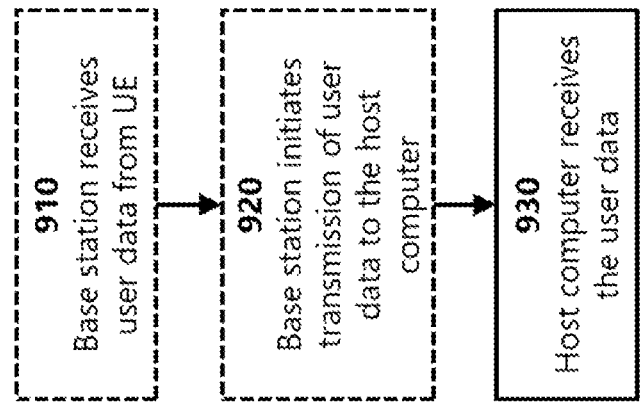
FIG. 23 is a flowchart illustrating a method implemented in a communication system, according to certain embodiments.

FIG. 23 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 23 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

1× RTT CDMA2000 1× Radio Transmission Technology
3GPP 3rd Generation Partnership Project
5G 5th Generation
5GC 5th Generation Core
5G-S-TMSI temporary identifier used in NR as a replacement of the S-TMSI in LTE
ABS Almost Blank Subframe
AMF Access Management Function
ARQ Automatic Repeat Request
ASN.1 Abstract Syntax Notation One
AWGN Additive White Gaussian Noise
BCCH Broadcast Control Channel
BCH Broadcast Channel
BWP Bandwidth Part
CA Carrier Aggregation
CC Carrier Component
CCCH SDU Common Control Channel SDU
CDMA Code Division Multiplexing Access
CGI Cell Global Identifier
CIR Channel Impulse Response
CMAS Commercial Mobile Alert System
CN Core Network
CORESET Control Resource Set
CP Cyclic Prefix
CPICH Common Pilot Channel
CPICH Ec/No CPICH Received energy per chip divided by the power density in the band
CRC Cyclic Redundancy Check
CQI Channel Quality information
C-RNTI Cell RNTI
CSI Channel State Information
DCCH Dedicated Control Channel
DCI Downlink Control Information
div Notation indicating integer division.
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
EPS Evolved Packet System
E-SMLC evolved Serving Mobile Location Center
E-UTRA Evolved UTRA
E-UTRAN Evolved UTRAN
ETWS Earthquake and Tsunami Warning System
FDD Frequency Division Duplex
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
ID Identity/Identifier
IMSI International Mobile Subscriber Identity
I-RNTI Inactive Radio Network Temporary Identifier
LOS Line of Sight
LPP LTE Positioning Protocol
LTE Long-Term Evolution MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
mod modulo
ms millisecond
MSC Mobile Switching Center
MSI Minimum System Information
NPDCCH Narrowband Physical Downlink Control Channel
NAS Non-Access Stratum
NGC Next Generation Core
NG-RAN Next Generation RAN
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PF Paging Frame
PGW Packet Gateway
PHICH Physical Hybrid-ARQ Indicator Channel
PLMN Public Land Mobile Network
PMI Precoder Matrix Indicator
PO Paging Occasion
PRACH Physical Random Access Channel
PRB Physical Resource Block
P-RNTI Paging RNTI
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RMSI Remaining Minimum System Information
RNA RAN Notification Area
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SAE System Architecture Evolution
SCH Synchronization Channel
SCell Secondary Cell
SDU Service Data Unit
SFN System Frame Number
SGW Serving Gateway
SI System Information
SIB System Information Block
SIB1 System Information Block type 1
SNR Signal to Noise Ratio
SON Self Optimized Network
SS Synchronization Signal
SSS Secondary Synchronization Signal
S-TMSI SAE-TMSI
TDD Time Division Duplex
TMSI Temporary Mobile Subscriber Identity
TDOA Time Difference of Arrival
TOA Time of Arrival
TSS Tertiary Synchronization Signal
TS Technical Specification
TSG Technical Specification Group
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WG Working Group
WLAN Wide Local Area Network

The invention claimed is:

1. A method performed by a wireless device of incrementally distributing wireless device capability information, the method comprising:
receiving a first device capability enquiry from a first network node;
transmitting a user equipment (UE) model identifier (UE-ModelId) to the first network node, wherein the UE-ModelId identifies a set of device capabilities for all wireless devices that share the same UE-ModelId; and
transmitting a subset of device capabilities associated with the UE-ModelId to the first network node, such that the subset of device capabilities is stored to build a larger set of device capabilities associated with the UE-ModelId.

2. The method of claim 1, further comprising transmitting a subset of device capabilities associated with the UE-ModelId to the first network node.

3. The method of claim 1, wherein the first device capability enquiry includes a first capability filter and the method further comprises:
determining a first subset of device capabilities identified by the first capability filter; and
transmitting the first subset of device capabilities to the first network node.

4. The method of claim 3, further comprising:
receiving a second device capability enquiry from a second network node, the second device capability enquiry including a second capability filter;
determining a second subset of device capabilities identified by the second capability filter; and
transmitting the second subset of device capabilities to the second network node.

5. The method of claim 3, wherein the capability filter comprises a bandwidth combination.

6. The method of claim 3, wherein the capability filter comprises a radio access technology (RAT) type.

7. A wireless device capable of incrementally distributing wireless device capability information, the wireless device comprising processing circuitry operable to:
    receive a first device capability enquiry from a first network node;
    transmit a user equipment (UE) model identifier (UE-ModelId) to the first network node, wherein the UE-ModelId identifies a set of device capabilities for all wireless devices that share the same UE-ModelId; and
    transmit a subset of device capabilities associated with the UE-ModelId to the first network node, such that the subset of device capabilities is stored to build a larger set of device capabilities associated with the UE-ModelId.

8. The wireless device of claim 7, wherein the processing circuitry is further operable to transmit a subset of device capabilities associated with the UE-ModelId to the first network node.

9. The wireless device of claim 8, wherein the first device capability enquiry includes a first capability filter and the processing circuitry is further operable to:
    determine a first subset of device capabilities identified by the first capability filter; and
    transmit the first subset of device capabilities to the first network node.

10. The wireless device of claim 9, the processing circuitry further operable to:
    receive a second device capability enquiry from a second network node, the second device capability enquiry including a second capability filter;
    determine a second subset of device capabilities identified by the second capability filter; and
    transmit the second subset of device capabilities to the second network node.

11. The wireless device of claim 9, wherein the capability filter comprises a bandwidth combination.

12. The wireless device of claim 9, wherein the capability filter comprises a radio access technology (RAT) type.

13. A method performed by a network node of incrementally obtaining wireless device capability information, the method comprising:
    receiving a context setup request for a first wireless device from an access and mobility management function (AMF);
    determining whether the context setup request includes device capability information relevant to the network node;
    upon determining the context setup request does not include device capability information relevant to the network node:
    transmitting a first device capability enquiry to the first wireless device;
    receiving a user equipment (UE) model identifier (UE-ModelId) from the first wireless device, wherein the UE-ModelId identifies a set of device capabilities for all wireless devices that share the same UE-ModelId;
        determining whether the network node has stored device capability information associated with the UE-ModelId that is relevant to the network node;
        upon determining the network node does not have stored device capability information associated with the UE-ModelId relevant to the network node:
        transmitting a second device capability enquiry to the first wireless device, the second device capability enquiry including a capability filter that identifies capability information relevant to the network node;
    receiving a first subset of device capabilities identified by the first capability filter from the first wireless device; and
    updating stored device capability information associated with the UE-ModelId with the first subset of device capabilities.

14. The method of claim 13, wherein receiving the UE-ModelId from the first wireless device further comprises receiving a subset of device capabilities associated with the UE-ModelId.

15. The method of claim 13, further comprising transmitting the UE-ModelId and the first subset of device capabilities to the AMF.

16. The method of claim 13, further comprising:
    transmitting a third device capability enquiry to a second wireless device, the third device capability enquiry including a capability filter that identifies capability information relevant to the base station;
    receiving a second subset of device capabilities identified by the first capability filter from the second wireless device; and
    updating stored device capability information associated with the UE-ModelId with the second subset of device capabilities.

17. The method of claim 16, further comprising transmitting the UE-ModelId and the second subset of device capabilities to the AMF.

18. The method of claim 13, wherein the capability filter comprises a bandwidth combination.

19. The method of claim 13, wherein the capability filter comprises a radio access technology (RAT) type.

20. A network node capable of incrementally obtaining wireless device capability information, the network node comprising processing circuitry operable to:
    receive a context setup request for a first wireless device from an access and mobility management function (AMF);
    determine whether the context setup request includes device capability information relevant to the network node;
    upon determining the context setup request does not include device capability information relevant to the base station:
    transmit a first device capability enquiry to the first wireless device;
    receive a user equipment (UE) model identifier (UE-ModelId) from the first wireless device, wherein the UE-ModelId identifies a set of device capabilities for all wireless devices that share the same UE-ModelId;
    determine whether the network node has stored device capability information associated with the UE-ModelId that is relevant to the network node;
    upon determining the network node does not have stored device capability information associated with the UE-ModelId relevant to the network node:
    transmit a second device capability enquiry to the first wireless device, the second device capability enquiry including a capability filter that identifies capability information relevant to the network node;
    receive a first subset of device capabilities identified by the first capability filter from the first wireless device; and
    update stored device capability information associated with the UE-ModelId with the first subset of device capabilities.

* * * * *